(12) United States Patent
Mizuhashi et al.

(10) Patent No.: US 11,494,020 B2
(45) Date of Patent: *Nov. 8, 2022

(54) DISPLAY DEVICE

(71) Applicant: Japan Display Inc., Tokyo (JP)

(72) Inventors: Hiroshi Mizuhashi, Tokyo (JP); Hayato Kurasawa, Tokyo (JP); Yoshitoshi Kida, Tokyo (JP); Toshinori Uehara, Tokyo (JP); Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,309

(22) Filed: Jun. 23, 2021

(65) Prior Publication Data

US 2021/0318772 A1    Oct. 14, 2021

Related U.S. Application Data

(63) Continuation of application No. 16/741,857, filed on Jan. 14, 2020, now Pat. No. 11,073,930, which is a continuation of application No. 15/848,073, filed on Dec. 20, 2017, now Pat. No. 10,572,047.

(30) Foreign Application Priority Data

Dec. 28, 2016    (JP) .............................. JP2016-255291

(51) Int. Cl.
  *G06F 3/041*    (2006.01)
  *G06F 3/044*    (2006.01)

(52) U.S. Cl.
  CPC .......... *G06F 3/0412* (2013.01); *G06F 3/0446* (2019.05); *G06F 3/04166* (2019.05); *G06F 2203/04107* (2013.01); *G09G 2310/0264* (2013.01)

(58) Field of Classification Search
  None
  See application file for complete search history.

(56) References Cited

U.S. PATENT DOCUMENTS 9,619,083 B1 *  4/2017  Kang ..................... G06F 3/0443
9,626,051 B2 *  4/2017  Zhao ..................... G06F 3/0446
9,671,883 B2 *  6/2017  Shin .................. G06F 3/041661
(Continued)

*Primary Examiner* — Patrick N Edouard
*Assistant Examiner* — Peijie Shen
(74) *Attorney, Agent, or Firm* — Michael Best & Friedrich LLP

(57) ABSTRACT

A display device comprises a first power supply line supplying a first potential, a second power supply line supplying a second potential, a third power supply line supplying a touch driving signal, and a display unit including a plurality of sub-pixels. The display unit comprises a plurality of first electrodes respectively provided in the plurality of sub-pixels and electrically connected to the first power supply line, a second electrode provided to be common among the plurality of sub-pixels and electrically connected to the second power supply line, a light emitting layer provided between the first electrode and the second electrode, a plurality of third electrodes electrically connected to the third power supply line, and a signal control circuit supplying a signal synchronized with a touch driving signal to the second electrode in a period in which a touch driving signal is supplied to the plurality of third electrodes.

16 Claims, 18 Drawing Sheets

(56) References Cited

U.S. PATENT DOCUMENTS

| | | | |
|---|---|---|---|
| 9,851,824 B2* | 12/2017 | Kida | G06F 3/0446 |
| 10,331,266 B2* | 6/2019 | Shin | H01L 27/323 |
| 2010/0039122 A1* | 2/2010 | McDonnell | H05B 1/0238 |
| | | | 324/662 |
| 2010/0123681 A1* | 5/2010 | Wu | G06F 3/045 |
| | | | 345/174 |
| 2010/0309150 A1* | 12/2010 | Lee | H01L 27/3251 |
| | | | 345/173 |
| 2011/0234534 A1* | 9/2011 | Mueck | G01R 27/2605 |
| | | | 345/174 |
| 2011/0279410 A1* | 11/2011 | Han | G06F 3/0446 |
| | | | 345/174 |
| 2012/0044195 A1* | 2/2012 | Nakanishi | G09G 3/3655 |
| | | | 345/173 |
| 2012/0075218 A1* | 3/2012 | Lin | G06F 3/0418 |
| | | | 345/173 |
| 2012/0218199 A1* | 8/2012 | Kim | G09G 3/3648 |
| | | | 345/173 |
| 2012/0249454 A1* | 10/2012 | Teraguchi | G06F 3/0445 |
| | | | 345/173 |
| 2013/0127752 A1* | 5/2013 | Takeuchi | G06F 3/04166 |
| | | | 345/173 |
| 2013/0154961 A1* | 6/2013 | Wu | G06F 3/041 |
| | | | 345/173 |
| 2013/0162560 A1* | 6/2013 | Sun | G06F 3/041 |
| | | | 345/173 |
| 2013/0162596 A1* | 6/2013 | Kono | G06F 3/03547 |
| | | | 345/174 |
| 2013/0249863 A1* | 9/2013 | Misaki | G06F 3/0445 |
| | | | 430/312 |
| 2013/0335366 A1* | 12/2013 | Lee | G06F 3/04184 |
| | | | 345/174 |
| 2014/0092051 A1* | 4/2014 | Weinerth | G06F 3/0443 |
| | | | 345/174 |
| 2014/0132534 A1* | 5/2014 | Kim | G06F 3/0416 |
| | | | 345/173 |
| 2014/0139239 A1* | 5/2014 | Zachut | G06F 3/0448 |
| | | | 324/658 |
| 2014/0160377 A1* | 6/2014 | Yamagishi | G06F 1/1643 |
| | | | 349/12 |
| 2014/0176826 A1* | 6/2014 | Kim | G06F 3/04164 |
| | | | 445/24 |
| 2014/0218328 A1* | 8/2014 | Haapakoski | G06F 3/04164 |
| | | | 345/174 |
| 2014/0232691 A1* | 8/2014 | Lee | G06F 3/0443 |
| | | | 345/174 |
| 2014/0368757 A1* | 12/2014 | Chen | G06F 3/0443 |
| | | | 349/12 |
| 2015/0002763 A1* | 1/2015 | Wu | G06F 1/1643 |
| | | | 349/12 |
| 2015/0042612 A1* | 2/2015 | Lee | G02F 1/136286 |
| | | | 349/12 |
| 2015/0070303 A1* | 3/2015 | Zhao | G06F 3/0412 |
| | | | 345/174 |
| 2015/0109231 A1* | 4/2015 | Shirai | G06F 3/0446 |
| | | | 345/173 |
| 2015/0145902 A1* | 5/2015 | Nakayama | G09G 3/3233 |
| | | | 345/691 |
| 2015/0309634 A1* | 10/2015 | Lee | G06F 3/0418 |
| | | | 345/173 |
| 2015/0378472 A1* | 12/2015 | Hekstra | G06F 3/04184 |
| | | | 345/17 |
| 2016/0041666 A1* | 2/2016 | Lee | G06F 3/0412 |
| | | | 345/174 |
| 2016/0124546 A1* | 5/2016 | Chen | G06F 3/0443 |
| | | | 345/174 |
| 2016/0209958 A1* | 7/2016 | Choi | G06F 3/0418 |
| 2016/0274721 A1* | 9/2016 | Ding | G06F 3/04184 |
| 2016/0303838 A1* | 10/2016 | Chen | B32B 27/06 |
| 2017/0010734 A1* | 1/2017 | Liu | H01L 27/323 |
| 2017/0068360 A1* | 3/2017 | Yuan | G06F 3/0412 |
| 2017/0184897 A1* | 6/2017 | Rho | G02F 1/13458 |
| 2017/0250229 A1* | 8/2017 | Lin | G06F 3/044 |
| 2017/0278900 A1* | 9/2017 | Yang | H01L 27/3272 |
| 2017/0338288 A1* | 11/2017 | Lee | G06F 3/044 |
| 2018/0018052 A1* | 1/2018 | Yang | G06F 3/0443 |
| 2018/0113549 A1* | 4/2018 | Park | G06F 3/03545 |
| 2018/0129327 A1* | 5/2018 | Kurasawa | G06F 3/04166 |
| 2018/0150670 A1* | 5/2018 | Jang | G06V 40/1318 |
| 2018/0307337 A1* | 10/2018 | Ahn | G06F 3/044 |
| 2019/0064955 A1* | 2/2019 | Wang | G06F 3/0445 |

* cited by examiner

DISPLAY DEVICE

CROSS REFERENCE TO RELATED APPLICATIONS

This application is a continuation of U.S. patent application Ser. No. 16/741,857, filed on Jan. 14, 2020, which, in turn, is a continuation of U.S. patent application Ser. No. 15/848,073 (now U.S. Pat. No. 10,572,047), filed on Dec. 20, 2017. Further, this application is based on and claims the benefit of priority from the prior Japanese Patent Application No. 2016-255291, filed on Dec. 28, 2016, the entire contents of which are incorporated herein by reference.

FIELD

The present invention relates to a display device. For example, the present invention relates to a display device equipped with a touch sensor.

BACKGROUND

A touch sensor has been known as an interface for a user to input information to a display device. When the touch sensor is installed on a screen of the display device, the user can input information to the display device and operate an application by touching an input button, an icon, and the like displayed on the screen. Japanese Patent Application Publication No. 2013-242699, for example, discloses a touch panel capable of uniquely determining touched coordinates.

In the touch panel described in Japanese Patent Application Publication No. 2013-242699, a self-capacitance system and a mutual capacitance system are adopted in combination to uniquely determine the touched coordinates. The touch panel is manufactured separately from a display device, and is used while overlapping the display device.

SUMMARY

According to an aspect of the present invention, a display device comprises a first power supply line supplying a first potential, a second power supply line supplying a second potential different from the first potential, a third power supply line supplying a touch driving signal, and a display unit including a plurality of sub-pixels. The display unit comprises a plurality of first electrodes respectively provided in the plurality of sub-pixels and electrically connected to the first power supply line, a second electrode provided to be common among the plurality of sub-pixels and electrically connected to the second power supply line, a light emitting layer provided between the first electrode in each of the sub-pixels and the second electrode, an insulating layer provided on the second electrode, a plurality of third electrodes provided on the insulating layer and electrically connected to the third power supply line, and a signal control circuit supplying a signal synchronized with a touch driving signal to the second electrode in a period in which the touch driving signal is supplied to the plurality of third electrodes from the third power supply line.

DESCRIPTION OF EMBODIMENTS

Figure 1:
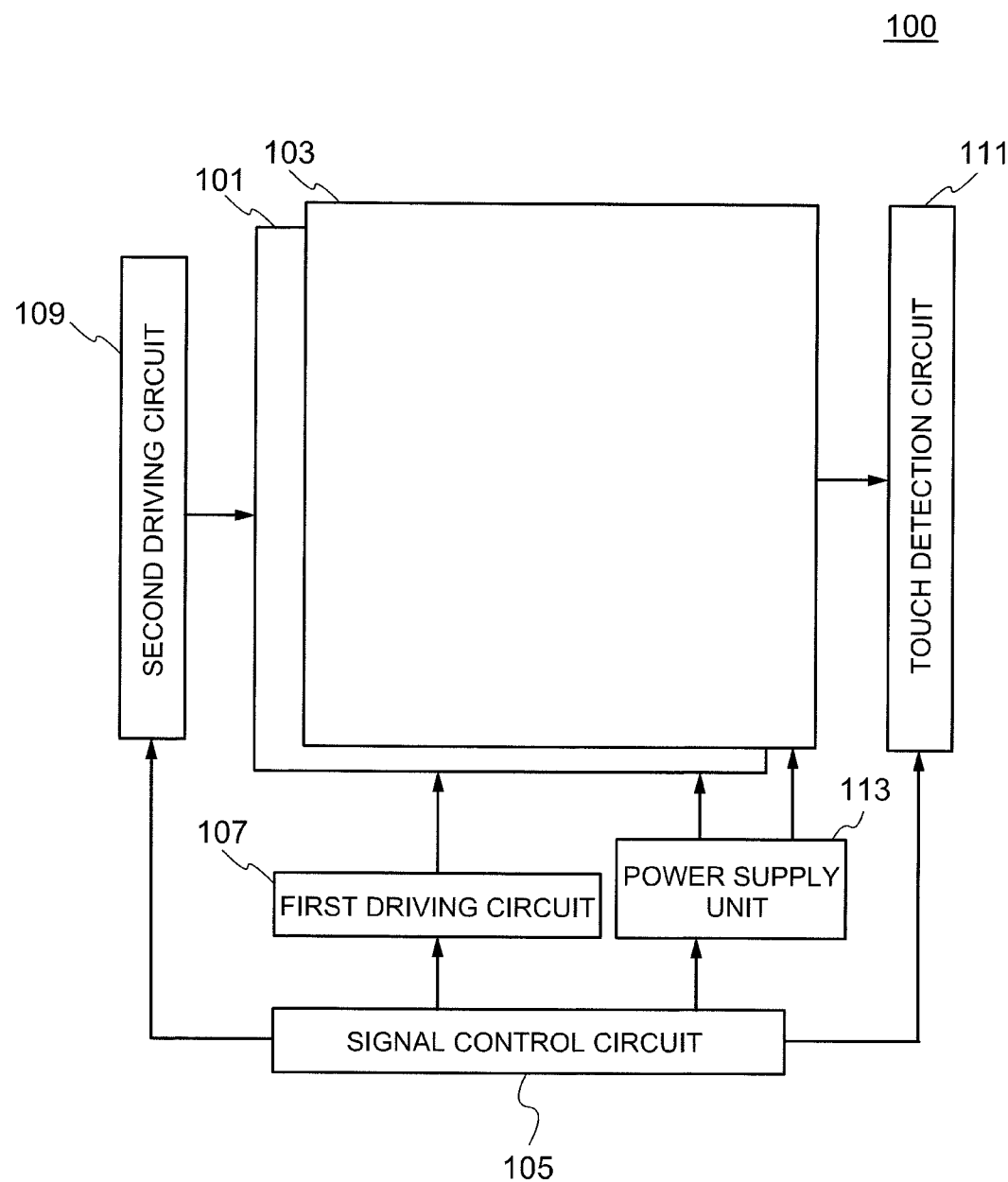
FIG. 1 is a functional block diagram illustrating an outline of a display device according to a first embodiment of the present invention.

Embodiments of the present invention will be described below with reference to the drawings. The disclosure is merely one example. An appropriate change made without departing from the spirit of the invention, which could have been easily conceived by a person skilled in the art, naturally falls within the scope of the invention. While a width, a thickness, a shape, and the like of each unit may be more schematically represented than those in an actual mode to make the description of the figures clearer, this is merely an example, and is not necessarily intended to limit an interpretation of the invention. In the specification and the drawings, similar elements to those described with reference to the previously described drawings may be assigned the same reference numerals to appropriately omit detailed description thereof. The embodiments, described below, are directed to providing a display device equipped with a touch sensor having an improved touch detection accuracy.

In the present invention, when one film is processed to form a plurality of films, the plurality of films may respectively have different functions and roles. However, the plurality of films are derived from a film formed as the same layer in the same process, and have the same layer structure and the same material.

Therefore, the plurality of films are defined as existing in the same layer.

In the specification and the claims, an expression that a component or a region is "on" another component or region encompasses a case where such a component or region is in direct contact with the another component or region and also a case where such a component is above or below the another component or region, namely, a case where still another component or region is provided between such a component or region and the another component or region, unless otherwise specified.

First Embodiment

A display device according to an embodiment of the present invention will be described below with reference to FIGS. 1 to 10. In a first embodiment, an organic EL display device provided with a touch sensor will be described. The embodiment, described below, is merely an embodiment of the present invention.

FIG. 1 is a functional block diagram illustrating an outline of a display device 100 according to a first embodiment of the present invention. The display device 100 comprises a display unit 101, a touch sensor unit 103, a signal control circuit 105, a first driving circuit 107, a second driving circuit 109, a touch detection circuit 111, and a power supply unit 113.

The display unit 101 is connected to the first driving circuit 107 and the second driving circuit 109. A plurality of pixel circuits are arranged in the display unit 101, and each of the pixel circuits is controlled by the first driving circuit 107 and the second driving circuit 109. A pixel in a single color for realizing a full-color is referred to as a sub-pixel, and a combination of minimum units of sub-pixels capable of realizing a full-color or a white color is referred to as a main pixel. In the following description, a circuit provided in each of the sub-pixels as a pixel circuit will be described. In the display unit 101, a plurality of pixel circuits may be arranged in a matrix manner.

The signal control circuit 105 controls the entire display device 100, i.e., the first driving circuit 107, the second driving circuit 109, the touch detection circuit 111, and the power supply unit 113. A video signal, a vertical synchronization signal, a horizontal synchronization signal, and a clock signal, for example, are supplies to the signal control circuit 105 via an external interface. The signal control circuit 105 generates various control signals such as a gate control signal, a source control signal, and a touch driving control signal required to control the first driving circuit 107, the second driving circuit 109, the touch detection circuit 111, and the power supply unit 113 using the vertical synchronization signal, the horizontal synchronization signal, and the clock signal. The signal control circuit 105 supplies the source control signal to the first driving circuit 107, supplies the gate control signal to the second driving circuit 109, and supplies the touch driving control signal to the power supply unit 113.

The first driving circuit 107 supplies a video signal to each of the pixel circuits based on the source control signal supplied from the signal control circuit 105. The first driving circuit 107 may include a selector which selects a column of the sub-pixels to which the video signal is to be supplied. The selector includes a multiplexer circuit, and the multiplexer circuit performs so-called multiplexer driving in which the video signal is sequentially supplied to the sub-pixels such as red sub-pixels, green sub-pixels, and blue sub-pixels.

The second driving circuit 109 is a driving circuit which selects a row into which the video signal is to be written based on the gate control signal supplied from the signal control circuit 105. A plurality of transistors are arranged in each of the pixel circuits, as described below. The second driving circuit 109 controls ON/OFF of the plurality of transistors in each of the pixel circuits. The second driving circuit 109 sequentially turns on the transistors arranged in each of the pixel circuits in each of the rows in a predetermined order. The second driving circuit 109 is a driving circuit which selects the row to which the video signal input by the first driving circuit 107 is to be supplied and supplies the video signal to a driving transistor arranged in each of the pixel circuits in the selected row.

The touch sensor unit 103 has a plurality of touch detection electrodes (corresponding to "third electrodes 449", described below). The touch detection electrodes may be respectively arranged to correspond to the sub-pixels. Alternatively, each of the touch detection electrodes may be arranged to extend over the two or more sub-pixels. In the present embodiment, each of the touch detection electrodes is arranged to extend over the sub-pixels in i rows×j columns (both i and j are respectively any integers) as an example. The touch detection electrodes may be arranged in a matrix manner in the touch sensor unit 103. The two adjacent touch detection electrodes among the plurality of touch detection electrodes provided in the touch sensor unit 103 are separated from each other. The plurality of touch detection electrodes are electrically independent of one another. Each of the plurality of touch detection electrodes is connected to a corresponding output terminal. The plurality of touch detection electrodes enter an active state upon being supplied with the touch driving signal from the power supply unit 113.

The touch detection circuit 111 is connected to the touch sensor unit 103, and a touch detection signal representing the presence or absence of contact or proximity ("contact" or "proximity" is hereinafter referred to as "touch") of an object to be detected with or to the touch sensor unit 103 is received from the touch sensor unit 103. More specifically, the touch sensor unit 103 is provided with the plurality of touch detection electrodes (corresponding to "third electrodes 449", described below), as described above, and the touch detection circuit 111 receives the touch detection signal via each of the touch detection electrodes. The touch detection circuit 111 includes an analog low pass filter (LPF) unit, an analog-to-digital (A/D) conversion unit, and a signal processing unit. A configuration of the touch detection circuit 111 will be described below. The object to be detected may be a finger of a user who uses the display device 100 and a stylus pen (hereinafter generically referred to as an object to be detected), for example. The touch detection circuit 111 detects the presence or absence of a touch by the object to be detected on the touch sensor unit 103 based on the touch detection signal supplied from the touch sensor unit 103.

The power supply unit 113 generates various power supply voltages required to drive each of the pixel circuits provided in the display unit 101, and supplies the power supply voltages to the display unit 101. The power supply unit 113 generates a touch driving signal in a touch detection period, described below, and supplies the generated touch driving signal to the touch detection electrode based on the touch driving control signal. The power supply unit 113 supplies a signal to a common electrode (corresponding to a "second electrode 435", described below) provided to be common among the sub-pixels in the display unit 101 in the touch detection period based on the vertical synchronization signal, the horizontal synchronization signal, and the clock signal, for example, supplied from the signal control circuit 105. The signal is synchronized with the touch driving signal supplied to the touch detection electrode. The power supply unit 113 supplies the signal, which is synchronized with the touch driving signal, to the common electrode in the touch detection period. The power supply unit 113 respectively generates power supply voltages required to drive the first driving circuit 107, the second driving circuit 109, and the touch detection circuit 111 and supplies the generated power supply voltages to the circuits.

Figure 2:
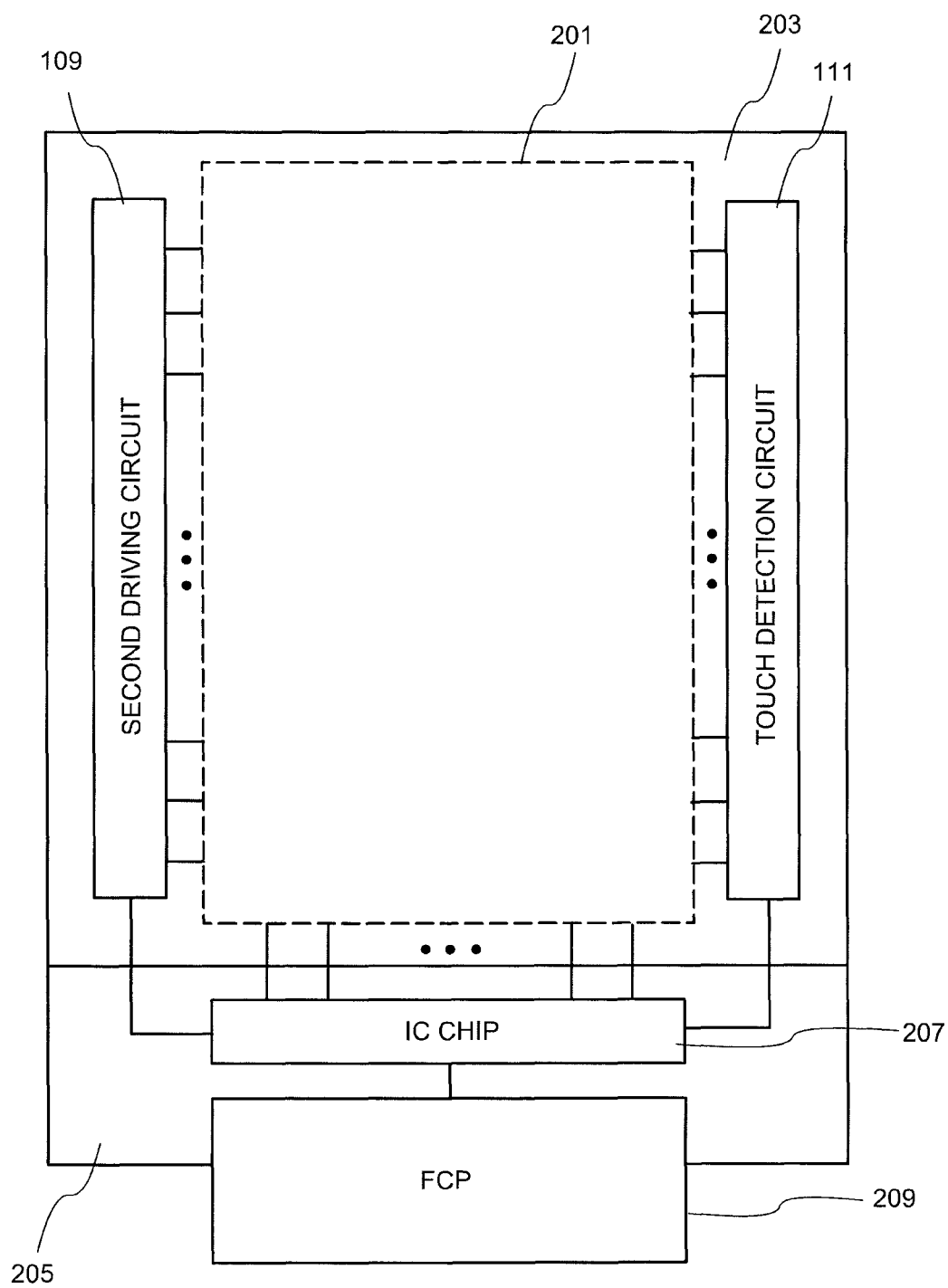
FIG. 2 is a schematic top view of a display unit in the display device according to the first embodiment of the present invention.
Figure 3:
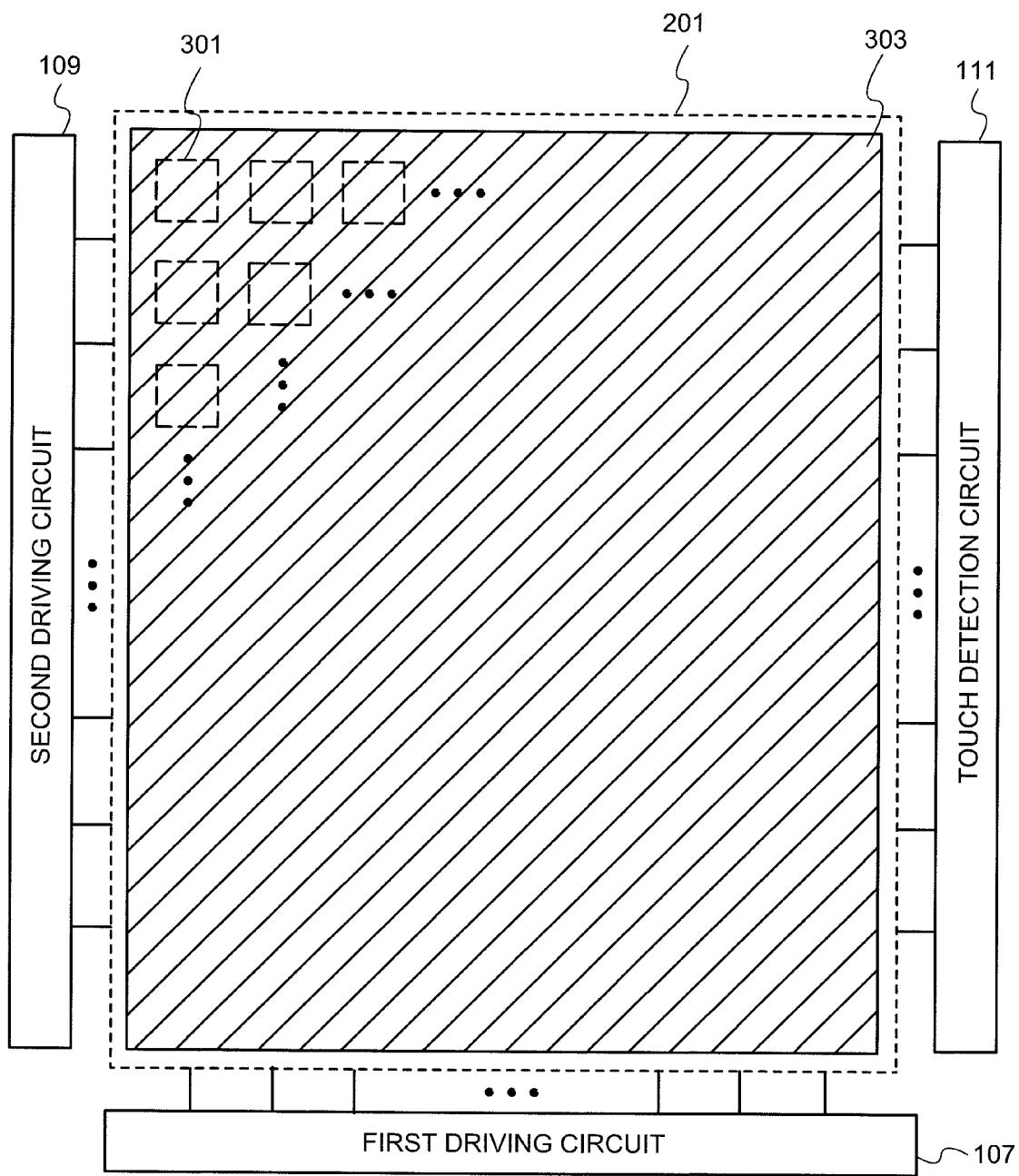
FIG. 3 is a schematic top view illustrating respective positions of a second electrode and sub-pixels in the display unit in the display device according to the first embodiment of the present invention.

A configuration of the display device 101 will be described with reference to FIGS. 2 and 3. FIG. 2 is a schematic top view of the display unit 101 in the display device 100 according to the first embodiment of the present invention. FIG. 3 is a schematic top view illustrating respective positions of a second electrode and pixels in the display unit 101 in the display device 100 according to the first embodiment of the present invention.

The display unit 101 includes a display area 201, a peripheral area 203, and a terminal area 205. The display area 201 is an area where pixels for displaying an image are arranged. The peripheral area 203 is an area around the display area 201. The terminal area 205 is an area adjacent to one end of the peripheral area 203.

The peripheral area 203 is provided with the second driving circuit 109 and the touch detection circuit 111. While the second driving circuit 109 and the touch detection circuit 111 are arranged in an area adjacent in a row direction to the display area 201 in FIG. 2, respective positions of the second driving circuit 109 and the touch detection circuit 111 are not limited to positions illustrated in FIG. 2.

An integrated circuit (IC) chip 207 and Flexible Printed Circuits (FPC) 209 are arranged in the terminal area 205. The IC chip 207 is provided with the signal control circuit 105, the first driving circuit 107, and the power supply unit 113, described above. The IC chip 207 is mounted using Chip On Glass (COG). The IC chip 207 is connected to wirings provided in the substrate. The IC chip 207 supplies a signal and power to various circuits via the wirings. Some or all of the second driving circuit 109 and the touch detection circuit 111 may be mounted on the IC chip 207. Some or all of the signal control circuit 105 and the first driving circuit 107 may be provided in the peripheral area 203.

The FPC 209 is electrically connected to the IC chip 207. The FPC 209 is connected to the second driving circuit 109 and the touch detection circuit 111 via the IC chip 207. The FPC 209 may be electrically connected to the second driving circuit 109 and the touch detection circuit 111 directly without via the IC chip 207. The FPC 209 is electrically connected to an external apparatus. An external signal including a video signal supplied from the external apparatus is inputted to the IC chip 207 via the FPC 209. The first driving circuit 107, the second driving circuit 109, and the touch detection circuit 109 are each driven in response to the signal inputted to the IC chip 207. A video signal (or a gradation signal) is supplied to sub-pixels 301 arranged in the display area 201 in response to the driving of the driving circuits, and an image based on the video signal is displayed on the display area 201. While the second driving circuit 109 and the touch detection circuit 111 are provided so that the display area 201 is sandwiched therebetween in FIGS. 2 and 3, an arrangement of the second driving circuit 109 and the touch detection circuit 111 is not limited to this. The second driving circuit 109 and the touch detection circuit 111 may be provided on the one side of the display area 201. The touch detection circuit 111 may be provided in the IC chip 207, or may be provided within another IC chip provided on the FPC 209.

As illustrated in FIG. 3, a plurality of sub-pixels 301 are provided in a matrix manner in the display area 201. A second electrode (common electrode) 303 is provided on the plurality of sub-pixels 301. The second electrode 303 is provided to be common among the plurality of sub-pixels 301. While an array of the sub-pixels 301 is a matrix array in the present embodiment, it may be a so-called delta array or pen tile array.

The plurality of sub-pixels 301 can be respectively provided with display elements such as light emitting elements or liquid crystal elements which display different colors. Thus, full-color display can be realized. For example, the three sub-pixels may be each provided with the display element which displays a red, green, or blue color. Alternatively, the four sub-pixels 301 may be each provided with a display element which displays a red, green, blue, or white color. The above-described color may be displayed by the display element itself, or may be displayed by using a color filter for a white light source.

In the present embodiment, the sub-pixel 301 is provided with a pixel electrode and an EL layer arranged on the pixel electrode, as described below. The second electrode (common electrode) 303 is provided, as illustrated in FIG. 3, on the EL layer. The pixel electrode, the EL layer, and the second electrode 303 form a light emitting element. A cathode power supply potential of the light emitting element is supplied to the second electrode 303.

Figure 4:
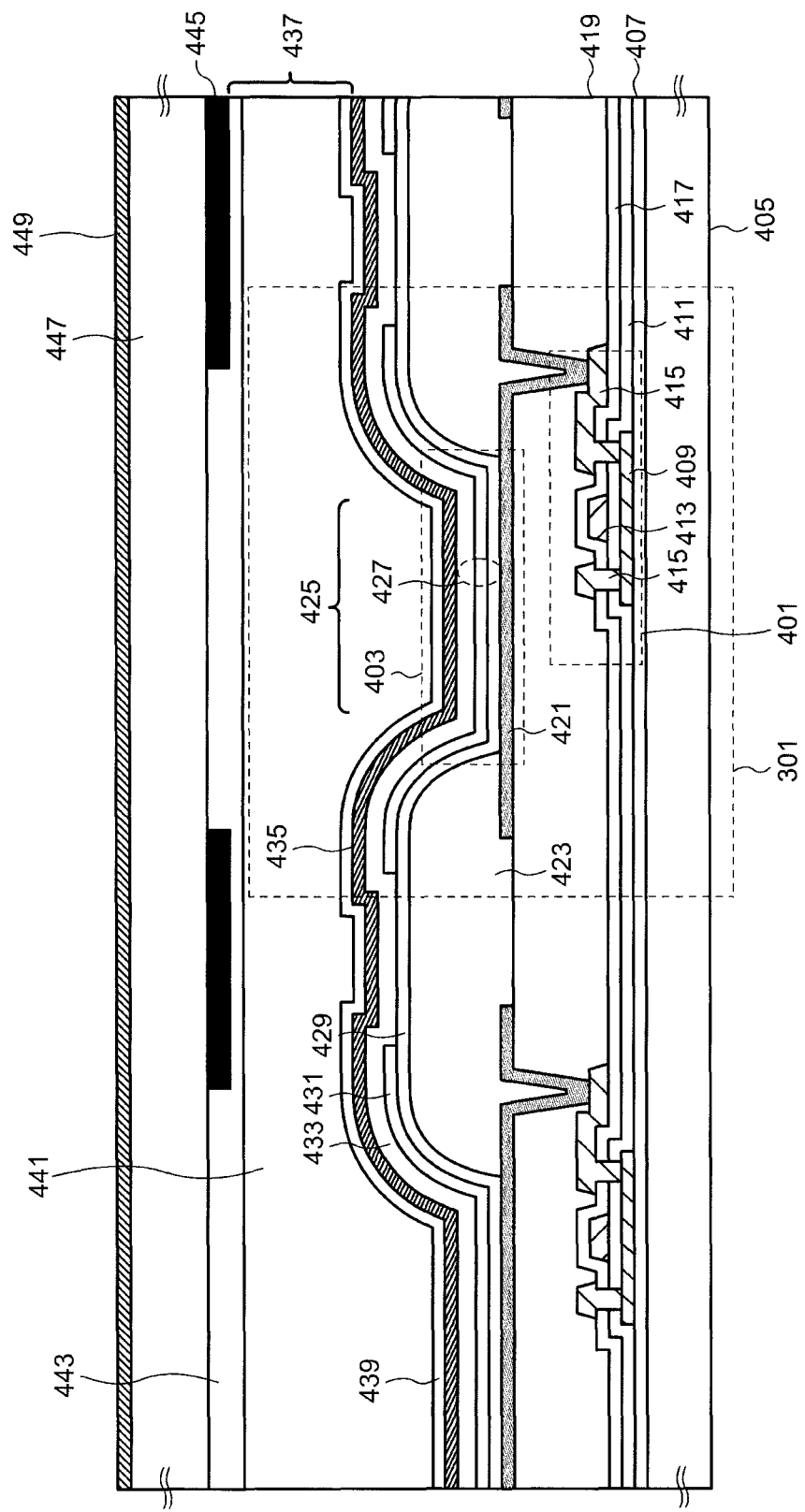
FIG. 4 is a cross-sectional view illustrating an outline of the display device according to the first embodiment of the present invention.

A configuration of the display device 100 will be described with reference to FIG. 4. FIG. 4 is a cross-sectional view illustrating an outline of the display device 100 according to the first embodiment of the present invention. As illustrated in FIG. 4, the sub-pixel 301 is provided with a transistor 401 and a light emitting element 403 connected to the transistor 401. FIG. 4 illustrates an example in which the one sub-pixel 301 is provided with the one transistor 401. However, the one sub-pixel 301 may be provided with a plurality of transistors. The one sub-pixel 301 may be provided with a functional element, other than the transistor, such as a capacitive element.

The transistor 401 includes a semiconductor film 409, a gate insulating film 411, a gate electrode 413, and source and drain electrodes 415 on an undercoat 407 provided on the substrate 405. An interlayer insulating film 417 is provided between the gate electrode 413 and the source and drain electrodes 415. In FIG. 4, the transistor 401 is a top gate-type transistor in which the gate electrode 413 is provided above the semiconductor film 409. However, a structure of the transistor 401 is not restricted. A bottom gate-type transistor in which the gate electrode 413 and the semiconductor film 409 are replaced with each other in a vertical relationship may be used. The transistor 401 has a top contact structure in which the source and drain electrodes 415 contact the semiconductor film 409 from above the semiconductor film 409. However, a vertical relationship between the semiconductor film 409 and the source and drain electrodes 415 can be optionally selected. The transistor 401 may have a bottom contact structure in which the source and drain electrodes 415 contact the semiconductor film 409 from below the semiconductor film 409.

A planarization film 419 is provided on the transistor 401. The planarization film 419 forms a flat surface by alleviating unevenness and inclination caused by the transistor 401 or the other functional element. The planarization film 419 is provided with an opening. A first electrode 421 of the light emitting element 403 is electrically connected to one of the source and drain electrodes 415 via the opening. The first electrode 421 is a pixel electrode. The first electrode 421 is arranged in each of the plurality of sub-pixels 301.

A partition wall 423 covers an end of the first electrode 421 while embedding the contact hole used to connect the first electrode 421 and one of the source and drain electrodes 415 to each other. The partition wall 423 is provided with an opening 425. An EL layer 427 is provided on the opening 425 and the partition wall 423. A second electrode 435 is provided on the EL layer 427. The second electrode 435 illustrated in FIG. 4 is the same member as the second electrode 303 illustrated in FIG. 3. The EL layer 427 includes a hole transport layer 429, a light emitting layer 431, and an electron transport layer 433. In the light emitting layer 431, a material corresponding to a display color of the sub-pixel 301 is included. That is, the display device 100 is a color-coded type EL display device. In the specification, the EL layer 427 means a layer provided between the first electrode 421 and the second electrode 435. In FIG. 4, the EL layer 427 comprises the hole transport layer 429, the light emitting layer 431, and the electron transport layer 433. However, the number of layers constituting the EL layer 427 is not limited to three. The EL layer 427 may include a hole injection layer, an electron block layer, an electron injection layer, and a hole block layer. Each of the hole transport layer and the electron transport layer may each have a multilayer structure.

An insulating film 437, a light shielding layer 445, an opposite substrate 447, and the third electrode 449 are provided on the second electrode 435. In FIG. 4, the insulating film 437 includes a first insulating layer 439, a second insulating layer 441, and a third insulating layer 443. The first insulating layer 439 is provided on the second electrode 435. The first insulating layer 439 includes a barrier film having a barrier property against water and oxygen. The third insulating layer 443 includes an overcoat film. The overcoat film alleviates unevenness and inclination caused by the light shielding layer 445 provided on the opposite substrate 447 and provides a flat surface. The second insulating layer 441 contains a filling material filling a space between the first insulating layer 439 and the third insulating layer 443 is to be filled. A structure of the insulating film 437 is not limited to a structure described above, but an insulating film formed of a single layer may be used.

The third electrode 449 is provided on the opposite side to the side, on which the light shielding layer 445 and the third insulating layer 443 are provided, of the opposite substrate 447. In other words, the side of a rear surface of the opposite substrate 447 faces the substrate 405, and the third electrode 449 is provided on the side of a front surface of the opposite substrate 447. The third electrode 449 is patterned, as described below. A protective layer, a cover film, or the like may be provided on the third electrode 449, although not illustrated in FIG. 4. A touch driving signal is supplied to the third electrode 449 from the power supply unit 113 via a power supply line. The third electrode 449 to which the touch driving signal has been supplied enters an active state so that an electric field is generated around the third electrode 449. When an object to be detected comes close to the third electrode 449 in the active state, a capacitor is formed in a pseudo manner between the third electrode 449 and the object to be detected to generate a capacitance so that a capacitance of the third electrode 449 increases. When a change in the capacitance of the third electrode 449 is detected, the presence or absence of a touch is determined.

If a potential of the touch driving signal supplied to the third electrode 449 and a potential of a voltage (common voltage) supplied to the second electrode 435 in the light emitting element 403 differ from each other, an electric field is formed between the third electrode 449 and the second electrode 435 so that a parasitic capacitance is generated between the third electrode 449 and the second electrode 435. It is considered that a detection sensitivity of a change in the capacitance of the third electrode 449 occurring by the object to be detected coming close to the third electrode 449 decreases by the parasitic capacitance generated between the third electrode 449 and the second electrode 435.

Therefore, in the display device 100 according to the first embodiment of the present invention, a signal, which is synchronized with the touch driving signal, is supplied to the second electrode 435 in a period in which the touch driving signal is supplied to the third electrode 449 (the period in which the touch driving signal is supplied to the third electrode 449 is hereinafter referred to as a touch detection period). When a potential of the third electrode 449 and a potential of the second electrode 435 are synchronized with each other in the touch detection period, a magnitude of the electric field formed between the third electrode 449 and the second electrode 435 is reduced. Therefore, a magnitude of the parasitic capacitance occurring between the third electrode 449 and the second electrode 435 can be reduced. As a result, the detection sensitivity of the change in the capacitance of the third electrode 449 occurring by the object to be detected coming close to the third electrode 449 can be improved.

A potential of the signal supplied to the second electrode 435 in the touch detection period may be such that the detection sensitivity of the change in the capacitance of the third electrode 449 occurring by the object to be detected coming close to the third electrode 449 does not decrease. A difference of the potential of the signal supplied to the second electrode 435 in the touch detection period from the potential of the touch driving signal supplied to the third electrode 449 is preferably small, and the potential of the signal supplied to the second electrode 435 is more preferably the same or substantially the same as the potential of the touch driving signal supplied to the third electrode 449. A predetermined cathode power supply potential PVSS is supplied to the second electrode 435 in a light emission period, and a signal, which is synchronized with the touch driving signal, is supplied to the second electrode 435 in the touch detection period, as described below.

Figure 5:
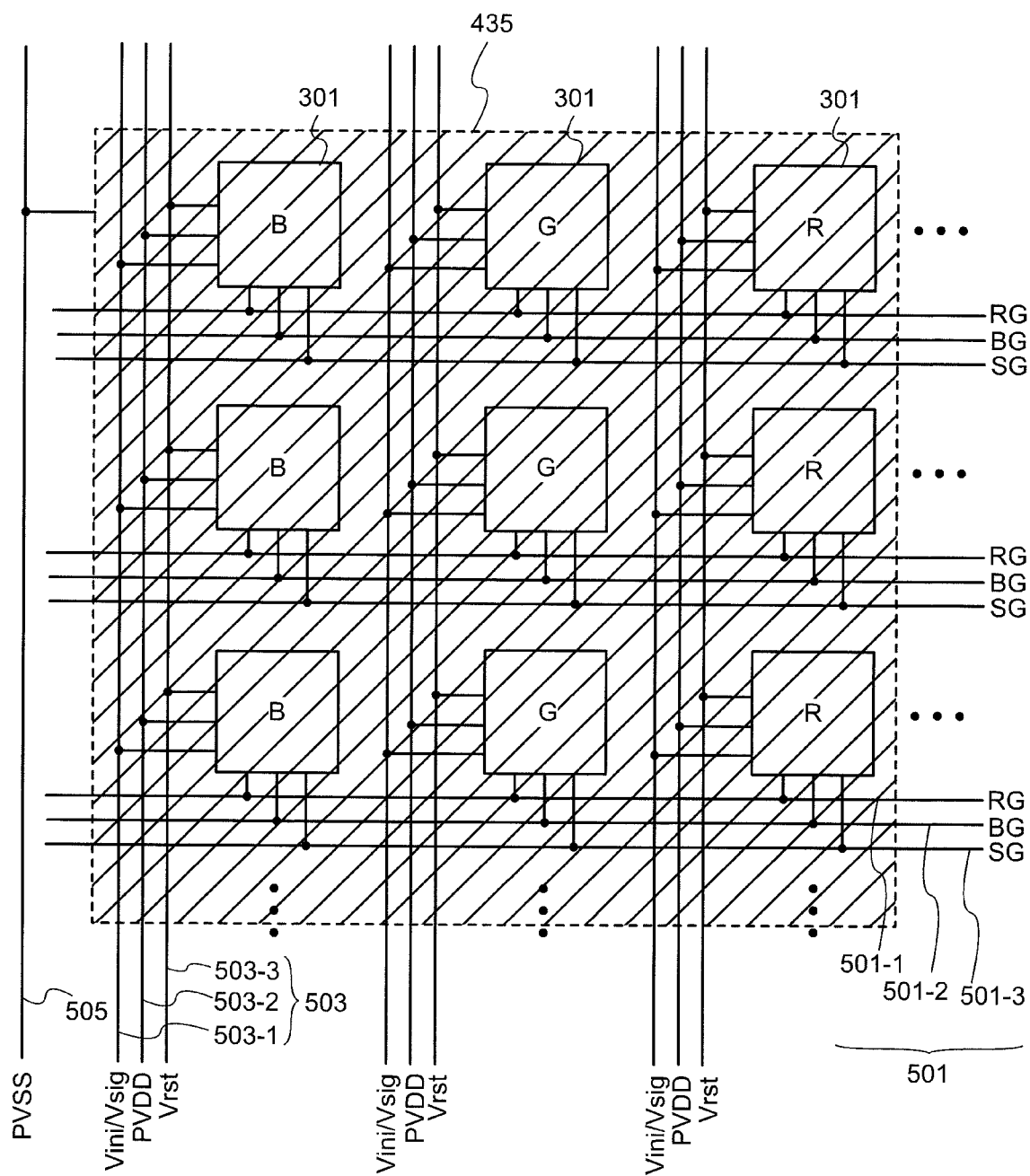
FIG. 5 is a schematic view illustrating an example of a circuit configuration of the display device according to the first embodiment of the present invention.

FIG. 5 is a schematic view illustrating an example of a circuit configuration of the display device 100 according to the first embodiment of the present invention. As illustrated in FIG. 5, the plurality of sub-pixels 301 are arranged in a matrix manner of x rows and y columns (both x and y are respectively any integers) in the display device 100. Each of the sub-pixels 301 is controlled by the second driving circuit 109 and the IC chip 207.

Each of the sub-pixels 301 is connected to the second driving circuit 109 via a control signal line 501. The control signal line 501 is connected to the gate electrode 413 of the transistor 401 provided in each of the sub-pixels 301. The control signal line 501 is also referred to as a gate line. In the present embodiment, a reset control signal line 501-1, an output control signal line 501-2, and a pixel control signal line 501-3 are provided as the control signal line 501, as illustrated in FIG. 5. The control signal lines 501-1 to 501-3 are sequentially exclusively selected in a predetermined order for each of the rows. A reset control signal RG is supplied to the reset control signal line 501-1. An output control signal BG is supplied to the output control signal line 501-2. A pixel control signal SG is supplied to the pixel control signal line 501-3.

A data signal line 503 is connected to the IC chip 207. The data signal line 503 is connected to one of the source and drain electrodes 415 of the transistor 401 provided in each of the sub-pixels 301. In other words, the video signal supplied from the external apparatus is inputted to the IC chip 207 via the FPC 209, and is supplied to each of the sub-pixels 301 from the IC chip 107 via the data signal line 503. The data signal line 503 is also referred to as a source line. In the present embodiment, a video signal line 503-1 is provided as the data signal line 503. The video signal line 503-1 is connected to the first driving circuit 107 provided in the IC chip 207. An anode power supply line 503-2 (a first power supply line) and a reset power supply line 503-3 extend in the same direction as that in which the video signal line 503-1 extends. The power supply lines 503-2 and 503-3 are connected to the power supply unit 113 provided in the IC chip 207, like the video signal line 503-1.

The data signal line 503 supplies a video signal or power at a predetermined potential to each of the sub-pixels 301 in the row selected by the control signal line 501. A video signal Vsig and an initialization potential Vini are alternately supplied to the video signal line 503-1. An anode power supply potential PVDD is supplied to the anode power supply line 503-2. A reset power supply potential Vrst is supplied to the reset power supply line 503-3.

A cathode power supply line 505 (a second power supply line) is further connected to the IC chip 207. The cathode power supply line 505 is connected to the second electrode 435 which is common among the sub-pixels 301. A cathode power supply potential PVSS is supplied to the cathode power supply line 505 from the power supply unit 113 provided in the IC chip 207.

Figure 6:
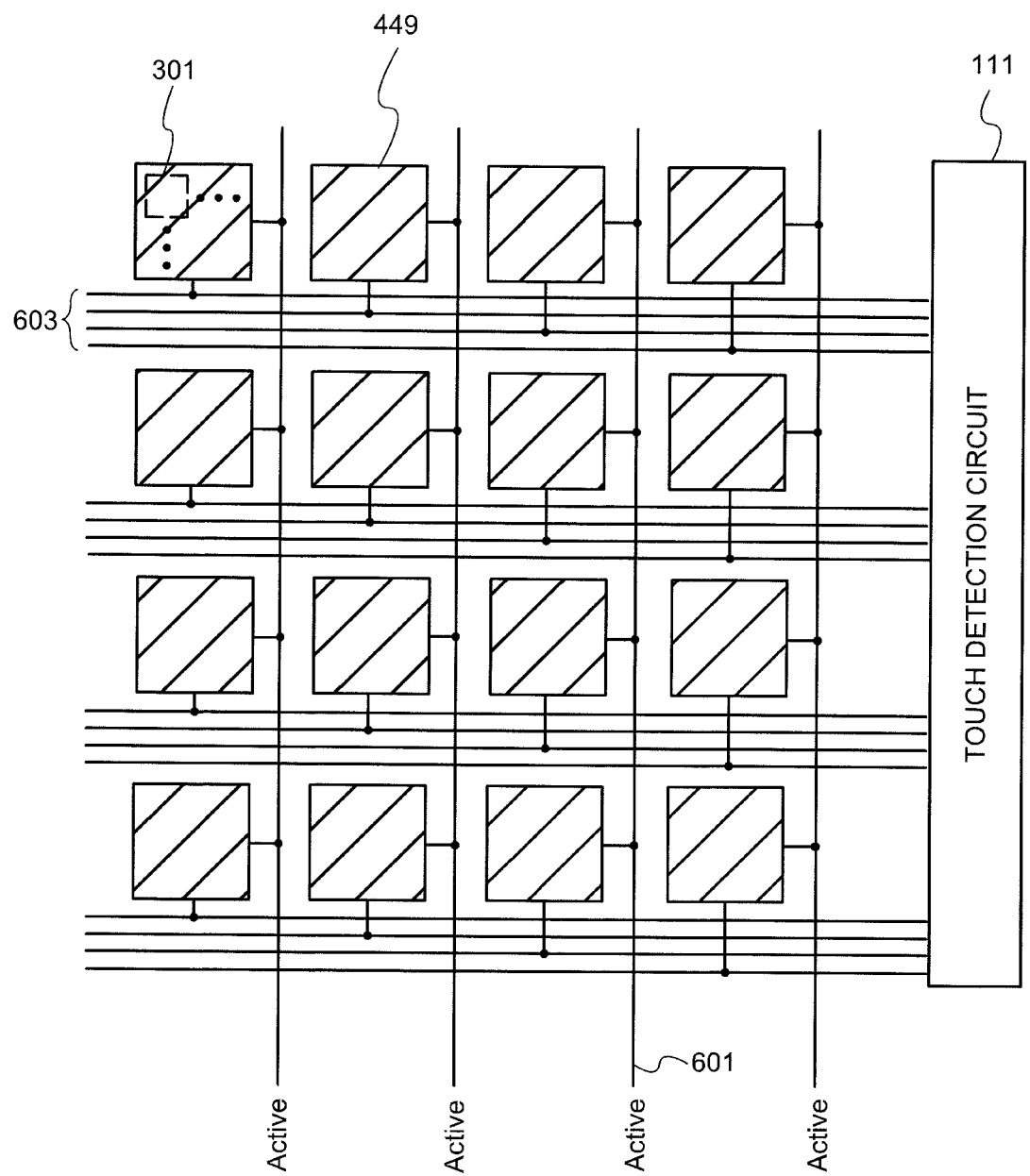
FIG. 6 is a schematic view illustrating an example of a configuration of the display device according to the first embodiment of the present invention.

FIG. 6 is a schematic view illustrating an example of a configuration of the display device 100 according to the first embodiment of the present invention. As illustrated in FIG. 6, the plurality of third electrodes 449 are arranged in a matrix manner of i rows×j columns (both i and j are respectively any integers) in the display device 100. Each of the third electrodes 449 is formed in a rectangular shape, and a space is provided between the adjacent third electrodes 449. The adjacent third electrodes 449 are neither physically connected to each other nor electrically connected to each other. The third electrode 449 is controlled by the IC chip 207. Touch sensor driving signal lines (third power supply lines) 601 are connected to the IC chip 207. The touch sensor driving signal line 601 is connected to the third electrodes 449. A touch driving signal Active is supplied to the touch sensor driving signal line 601 from the power supply unit 113 provided in the IC chip 207.

Each of the third electrodes 449 is connected to the touch detection circuit 111 via a touch detection signal line 603. The third electrode 449 and the touch detection signal line 603 are connected to each other on a one-to-one basis. A touch detection signal corresponding to the capacitance of each of the third electrodes 449 is supplied to the touch detection circuit 111 via the touch detection signal line 603. Both the touch sensor driving signal line 601 and the touch detection signal line 603 are provided on the opposite substrate 447. A configuration in which one of the touch sensor driving signal line 601 and the touch detection signal line 603 is formed in the same layer as that in which the third electrodes 449 are formed, the other signal line is formed in a different layer from that in which the third electrodes 449 are formed, and an insulating layer is provided between the layers in which the signal lines are respectively formed and the third electrodes 449 while the signal lines are electrically connected to each of the third electrodes 449 via a through hole may be adopted. Alternatively, a configuration in which both the touch sensor driving signal line 601 and the touch detection signal line 603 are formed in a different layer from that in which the third electrodes 449 are formed, and an insulating layer is provided between the layer in which the signal lines are formed and the layer in which the third electrodes 449 are formed while each of the third electrodes 449 and the signal lines are electrically connected to each other via a contact hole may be adopted. For connection between the touch sensor driving signal line 601 and the IC chip 207 and connection between the touch detection signal line 603 and the touch detection circuit 111, a configuration in which an upper surface of the opposite substrate 447 and an upper surface of the substrate 405 are electrically connected to each other by providing the opposite substrate 447 with a through hole and a configuration in which they are connected to each other with the FPC 209 provided between the opposite substrate 447 and the substrate 405, for example, can be adopted.

Figure 7:
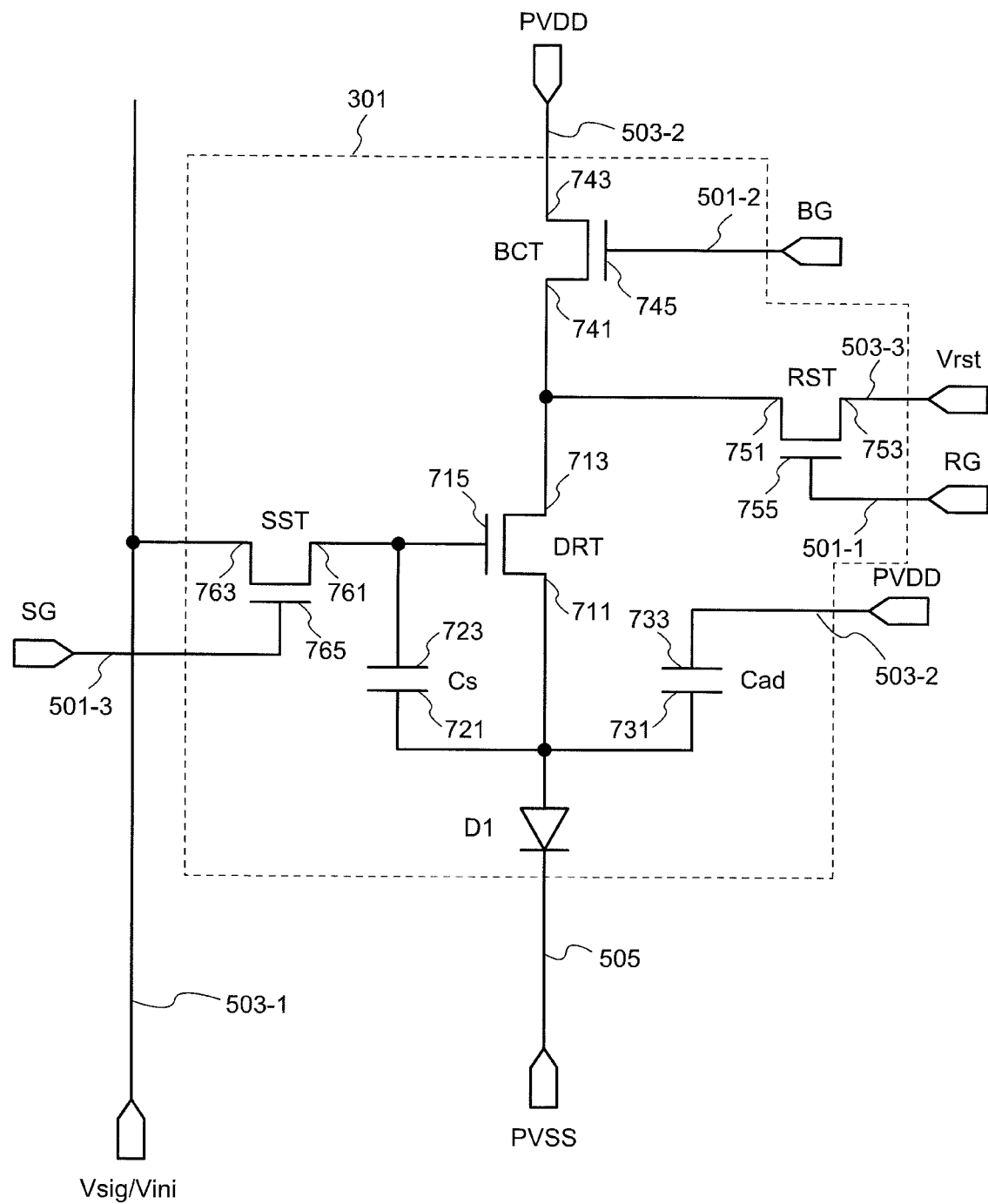
FIG. 7 is a circuit diagram illustrating an example of a circuit configuration of a pixel circuit according to the first embodiment of the present invention.

FIG. 7 is a circuit diagram illustrating an example of a circuit configuration of the pixel circuit according to the first embodiment of the present invention. All transistors constituting the sub-pixel 301 illustrated in FIG. 7 are each an n-channel transistor. As illustrated in FIG. 7, the sub-pixel 301 includes a light emitting element D1, a driving transistor DRT, an output transistor BCT, a reset transistor RST, a pixel selection transistor SST, a retentive capacitor Cs, and an auxiliary capacitor Cad. In the following description, one of a source terminal and a drain terminal of the transistor is referred to as a first terminal, and the other of the source terminal and the drain terminal of the transistor is referred to as a second terminal. One of a pair of terminals of the capacitive element is referred to as a first terminal, and the other of the pair of terminals of the capacitive element is referred to as a second terminal.

A first terminal 711 of the driving transistor DRT is connected to an anode terminal of the light emitting element D1, a first terminal 721 of the retentive capacitor Cs, and a first terminal 731 of the auxiliary capacitor Cad. A second terminal 713 of the driving transistor DRT is connected to a first terminal 741 of the output transistor BCT and a first terminal 751 of the reset transistor RST. A cathode terminal of the light emitting element D1 is connected to the cathode power supply line 505. A second terminal 733 of the auxiliary capacitor Cad is connected to the anode power supply line 503-2. A second terminal 743 of the output transistor BCT is connected to the anode power supply line 503-2. A second terminal 753 of the reset transistor RST is connected to the reset power supply line 503-3. A first terminal 761 of the pixel selection transistor SST is connected to a gate terminal 715 of the driving transistor DRT and a second terminal 723 of the retentive capacitor Cs. A second terminal 763 of the pixel selection transistor SST is connected to the video signal line 503-1. A gate terminal 755 of the reset transistor RST is connected to the reset control signal line 501-1. A gate terminal 745 of the output transistor BCT is connected to the output control signal line 501-2. A gate terminal 765 of the pixel selection transistor SST is connected to the pixel control signal line 501-3.

If the above-described configuration is put otherwise, the anode power supply line 503-2 supplies the anode power supply potential PVDD to the first electrode 421 provided in each of the plurality of sub-pixels 301. The cathode power supply line 505 supplies the cathode power supply potential PVSS to the second electrode 435 common among the sub-pixels 301. Each of the sub-pixels 301 may be arranged between the anode power supply line 503-2 and the cathode power supply line 505. A potential difference between the anode power supply potential PVDD and the cathode power supply potential PVSS is determined based on a luminescence intensity of the light emitting element D1. In the present embodiment, the cathode power supply potential PVSS supplied to the second electrode 435 via the cathode power supply line 505 is synchronized with the touch driving signal Active while the touch driving signal Active is supplied to the third electrodes 449 via the touch sensor driving signal line 601.

The anode terminal of the light emitting element D1 corresponds to the first electrode 421. That is, the first terminal 711 of the driving transistor DRT is connected to the first electrode 421. The second terminal 713 of the driving transistor DRT is connected to the anode power supply line 503-2 via the output transistor BCT. The output transistor BCT switches a connection status between the anode power supply line 503-2 and the driving transistor DRT into a conductive state or a non-conductive state. The cathode terminal of the light emitting element D1 corresponds to the second electrode 435.

While a configuration in which all the transistors included in the sub-pixel 301 are each an n-channel transistor is illustrated in the present embodiment, a configuration of the sub-pixel 301 in the display device 100 according to the present invention is not limited to this configuration. For example, all transistors, other than the driving transistor DRT, constituting the sub-pixel 301 may be each a p-channel transistor, or may be each both an n-channel transistor and a p-channel transistor. The above-described transistor may be a switching element which can be switched between an on state and off state, or may be replaced with a switching element.

Figure 8:
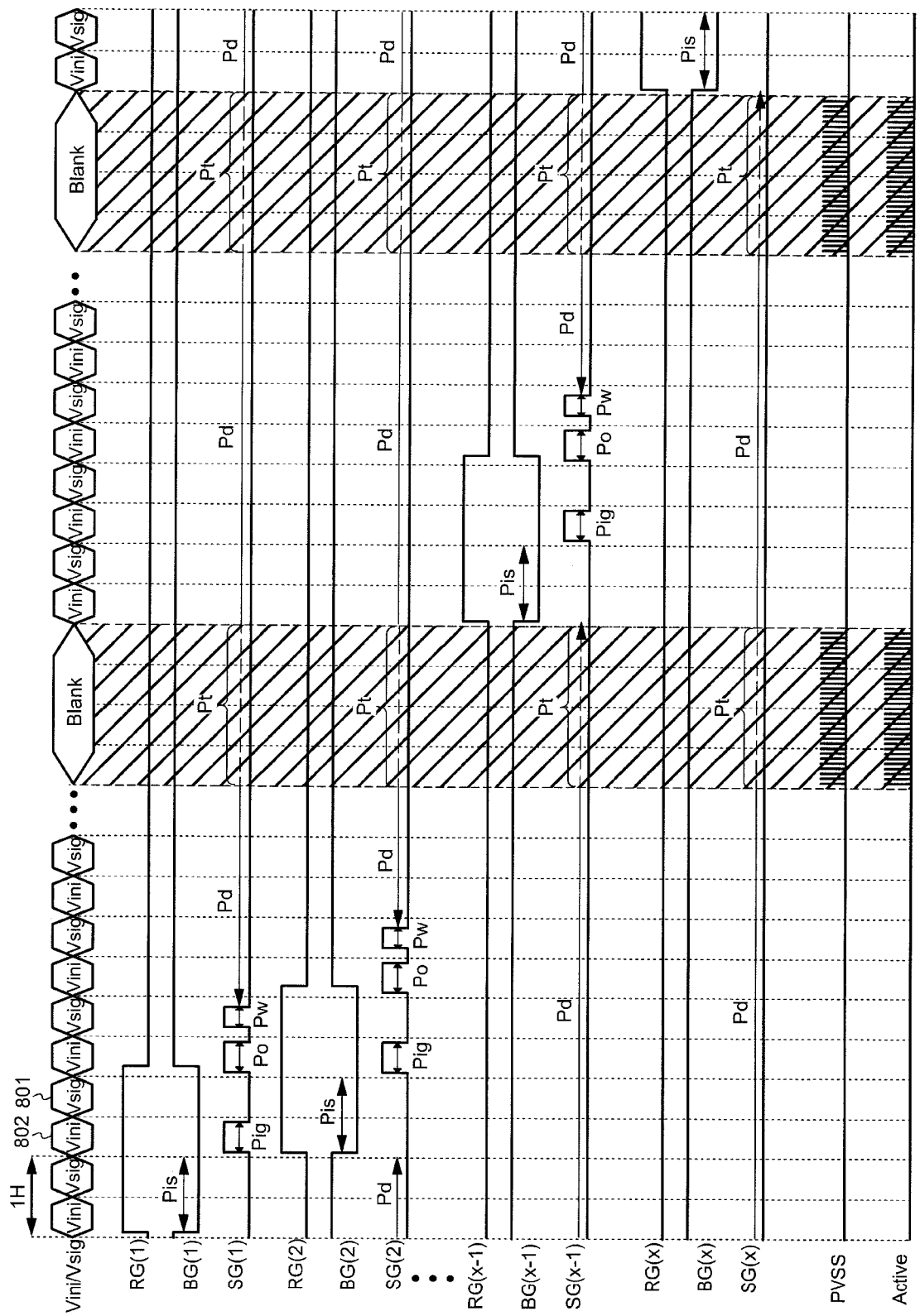
FIG. 8 is a timing chart illustrating a method for driving the pixel circuit in the display device according to the first embodiment of the present invention.
Figure 9:
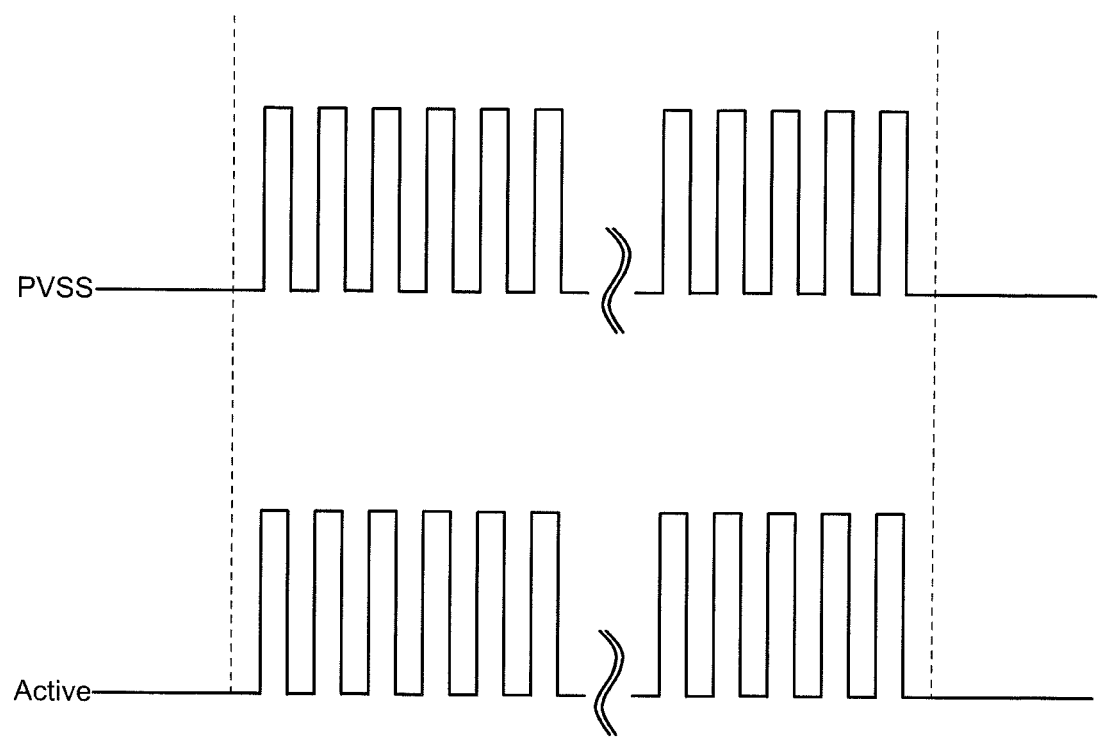
FIG. 9 is a partially enlarged view of the timing chart illustrated in FIG. 8.

FIG. 8 is a timing chart illustrating a method for driving the pixel circuit in the display device 100 according to the first embodiment of the present invention. FIG. 9 is a partially enlarged view of the timing chart illustrated in FIG. 8. Driving of the pixel circuit, described below, is controlled by the signal control circuit 105 illustrated in FIG. 1. In the present embodiment, a case where all the transistors constituting the pixel circuit are each of an n-channel type is illustrated. In this case, when a "low-level" control signal is supplied to a gate terminal of the transistor, the transistor enters an off state (non-conductive state). On the other hand, when a "high-level" control signal is supplied to the gate terminal of the transistor, the transistor enters an on state (conductive state). A method for driving the display device 100 will be described below with reference to FIGS. 7 to 9.

In FIG. 8, "1H" means one horizontal period. The one horizontal period means a period in which a video signal is written into the sub-pixels 301 in one row. An initialization potential Vini, along with a video signal Vsig, is supplied as the video signal to the video signal line 503-1. In one horizontal period, a period 801 indicated by "Vsig" is a period in which the video signal Vsig is being supplied, and a period 802 indicated by "Vini" is a period in which the initialization potential Vini is being supplied. The display device 100 has a source initialization period (Pis), a gate initialization period (Pig), a threshold value compensation period (Po), a writing period (Pw), and a light emission period (Pd).

[Source Initialization Period]

In the source initialization period (Pis), the reset control signal RG changes from a low level to a high level, and the output control signal BG changes from a high level to a low level. That is, the reset transistor RST is turned on, and the output transistor BCT is turned off. Therefore, the second terminal 713 of the driving transistor DRT is disconnected to the anode power supply line 503-2 when the output transistor BCT is turned off. A reset power supply potential Vrst is supplied to the second terminal 713 of the driving transistor DRT via the reset transistor RST. A pixel control signal SG is maintained at a low level, and the pixel selection transistor SST is kept off.

The reset power supply potential Vrst is set to a potential lower than a floating potential of the gate terminal 715 (i.e., a potential which may be supplied to the gate terminal 715) of the driving transistor DRT so that the driving transistor DRT is turned on. By the above-described operation, the first terminal 711 and the second terminal 713 of the driving transistor DRT are reset to the same potential as the reset power supply potential Vrst. A potential, which is lower than the cathode power supply potential PVSS, may be set as the reset power supply potential Vrst. However, the reset power supply potential Vrst need not necessarily be lower than the cathode power supply potential PVSS, and can be such a potential that no current flows through the light emitting element D1 in the source initialization period (Pis). More specifically, the reset power supply potential Vrst can be set to lower than or equal to a potential which is higher by a threshold voltage of the driving transistor DRT than the cathode power supply potential PVSS. By the operations, the supply of a current to the light emitting element D1 is stopped so that the display device 100 enters a non-luminescent state.

[Gate Initialization Period]

In the gate initialization period (Pig), the pixel control signal SG changes from a low level to a high level so that the pixel selection transistor SST is turned on. Therefore, the gate terminal 715 of the driving transistor DRT is connected to the video signal line 503-1 via the pixel selection transistor SST. At this time, the initialization potential Vini is being supplied to the video signal line 503-1. Thus, the initialization potential Vini is supplied to the gate terminal 715 of the driving transistor DRT.

The initialization potential Vini is set to a potential higher than the reset power supply potential Vrst. Therefore, the initialization potential Vini of the gate terminal 715 of the driving transistor DRT is higher than the reset power supply potential (Vrst) of the second terminal 713 of the driving transistor DRT. Thus, the driving transistor DRT is turned on. In this period, a charge based on a potential difference between the reset power supply potential Vrst and the initialization potential Vini is retained in the retentive capacitor Cs.

[Threshold Value Compensation Period]

In the threshold value compensation period (Po), the pixel control signal SG first changes from a low level to a high level so that the pixel selection transistor SST is turned on. At this time, the initialization potential Vini is being supplied to the video signal line 503-1. Thus, the gate terminal 715 of the driving transistor DRT is fixed to the initialization potential Vini. Then, the reset control signal RG changes from a high level to a low level, and the output control signal BG changes from a low level to a high level. That is, the reset transistor RST is turned off, and the output transistor BCT is turned on. Therefore, the second terminal 713 of the driving transistor DRT is disconnected to the reset power supply line 503-3 when the reset transistor RST is turned off. On the other hand, the anode power supply potential PVDD is supplied to the second terminal 713 of the driving transistor DRT via the output transistor BCT.

The gate terminal 715 of the driving transistor DRT is fixed to the initialization potential Vini higher than the reset power supply potential Vrst. Thus, the driving transistor DRT is in an on state. Therefore, a current flows through a channel of the driving transistor DRT by the anode power supply potential PVDD supplied to the second terminal 713 of the driving transistor DRT, and a potential of the first terminal 711 of the driving transistor DRT rises. When a difference between the potential of the first terminal 711 of the driving transistor DRT and the potential of the gate terminal 715 reaches a threshold voltage VTH of the driving transistor DRT, the driving transistor DRT is turned off. More specifically, the gate terminal 715 is fixed to the initialization potential Vini. Thus, when the potential of the first terminal 711 reaches (Vini−VTH), the driving transistor DRT is turned off.

At this time, the initialization potential Vini is supplied to the second terminal 723 of the retentive capacitor Cs, and (Vini−VTH) is supplied to the first terminal 721 of the retentive capacitor Cs. Thus, a charge based on the threshold voltage VTH of the driving transistor DRT is retained in the retentive capacitor Cs. That is, in the threshold value compensation period (Po), a charge based on the threshold voltage VTH of the driving transistor DRT is retained in the retentive capacitor Cs. To suppress light emission of the light emitting element D1 in the threshold value compensation period (Po), the initialization potential Vini is preferably set so that {(Vini−VTH)−PVSS}<a threshold voltage of the light emitting element D1.

[Writing Period]

In the writing period (Pw), the pixel control signal SG changes from a low level to a high level with the reset control signal RG being at a low level and the output control signal BG being at a high level. That is, the reset transistor RST is turned off, the output transistor BCT is turned on, and the pixel selection transistor SST is turned on. At this time, the video signal Vsig is supplied to the video signal line 503-1. Therefore, the potential of the gate terminal 715 of the driving transistor DRT and the potential of the second terminal 723 of the retentive capacitor Cs each change from Vini to Vsig.

When the potential of the second terminal 723 of the retentive capacitor Cs changes from Vini to Vsig, a potential Vs the first terminal 721 of the retentive capacitor Cs rises based on (Vsig−Vini). Since the retentive capacitor Cs and the auxiliary capacitor Cad are connected in series, the potential Vs of the first terminal 721 of the retentive capacitor Cs positioned midway between the capacitors is represented by the following expression (1):

[Expression 1]

$$Vs = (Vini - VTH) + (Vsig - Vini)\frac{Cs}{Cs + Cad} \quad (1)$$

Therefore, a potential difference (Vgs) between the potential of the first terminal 711 and the potential of the gate terminal 715 of the driving transistor DRT is represented by the following expression (2). That is, when the video signal Vsig is supplied to the gate terminal 715, a charge based on the threshold voltage VTH of the driving transistor DRT and the video signal Vsig can be retained in the retentive capacitor Cs. Thus, the driving transistor DRT is turned on based on a potential difference obtained by adding the threshold voltage VTH of the driving transistor DRT to the video signal Vsig.

[Expression 2]

$$Vgs = Vsig - \left\{(Vini - VTH) + (Vsig - Vini)\frac{Cs}{Cs + Cad}\right\} \quad (2)$$

[Light Emission Period]

In the light emission period (Pd), the pixel control signal SG enters a low level with the reset control signal RG being at a low level and the output control signal BG being at a high level. That is, the reset transistor RST is turned off, the output transistor BCT is turned on, and the pixel selection transistor SST is turned off. Thus, the driving transistor DRT provides a current based on the foregoing expression (2) in the anode power supply potential PVDD supplied to the second terminal 713 to the light emitting element D1.

A current (Id) flowing through the driving transistor DRT is represented by the following expression (3). When the expression (2) is substituted into the expression (3), the threshold voltage VTH of the driving transistor DRT is erased from the expression (3), and the current (Id) becomes a current not dependent on the threshold voltage VTH, as represented by the following expression (4):

[Expression 3]

$$Id = \beta(Vgs - VTH)^2 \quad (3)$$

[Expression 4]

$$Id = \beta\left\{(Vsig - Vini)\frac{Cad}{Cs + Cad}\right\}^2 \quad (4)$$

As described above, a current, from which an effect of the threshold voltage VTH of the driving transistor DRT has been excluded, can be supplied to the light emitting element D1 in the light emission period (Pd). That is, a current, which has been compensated for the threshold voltage VTH of the driving transistor DRT, can be supplied to the light emitting element D1. The light emission period (Pd) is maintained until the output control signal BG becomes the low level again in the subsequent frame period. That is, the signal control circuit 105 sequentially repeats the source initialization period (Pis), the gate initialization period (Pig), the threshold value compensation period (Po), the writing period (Pw), and the light emission period (Pd), described above. The signal control circuit 105 performs control to shift the source initialization period (Pis), the gate initialization period (Pig), the threshold value compensation period (Po), the writing period (Pw), and the light emission period (Pd) to those in the subsequent pixel row, to executes the source initialization period (Pis), the gate initialization period (Pig), the threshold value compensation period (Po), the writing period (Pw), and the light emission period (Pd) for each of pixel rows in one frame.

As illustrated in FIG. 8, the touch driving signal Active is supplied to the third electrodes 449 in the display device 100 via the touch sensor driving signal line 601 in a predetermined period (a period in which a Blank is supplied to the video signal line 503-1) in the light emission period (Pd). A period in which the touch driving signal Active is supplied to the third electrodes 449 is referred to as a touch detection period (Pt). In the touch detection period (Pt), the third electrode 449 enters an active state. The touch driving signal Active is a pulse wave, for example. At least one of a high-level potential and a low-level potential of the pulse wave differs from the cathode power supply potential PVSS in the light emission period (Pd) excluding the touch detection period (Pt). For example, the low-level potential of the pulse wave may be equal to the cathode power supply potential PVSS in the light emission period (Pd) excluding the touch detection period (Pt), and the high-level potential of the pulse wave may be higher than the cathode power supply potential PVSS in the light emission period (Pd) excluding the touch detection period (Pt).

In the touch detection period (Pt), the cathode power supply potential PVSS supplied to the second electrode 435 via the cathode power supply line 505 is synchronized with the touch driving signal Active. That is, the power supply unit 113 synchronizes the cathode power supply potential PVSS supplied to the second electrode 435 in the touch detection period (Pt) with the touch driving signal Active based on the touch driving control signal supplied from the signal control circuit 105. Therefore, the cathode power supply potential PVSS supplied to the second electrode 435 varies in synchronization with the touch driving signal Active, as illustrated in FIG. 9, in the touch detection period (Pt), although the cathode power supply potential PVSS is constant in the source initialization period (Pis), the gate initialization period (Pig), the threshold value compensation period (Po), the writing period (Pw), and the light emission period (Pd) excluding the touch detection period (Pt).

In the touch detection period (Pt), a difference of the cathode power supply potential PVSS supplied to the second electrode 435 from the potential of the touch driving signal Active supplied to the third electrode 449 is preferably small such that the detection sensitivity of the change in the capacitance of the third electrode 449 occurring by the object to be detected coming close to the third electrode 449 does not decrease. The cathode power supply potential PVSS supplied to the second electrode 435 in the touch detection period (Pt) is preferably the same or substantially the same as the potential of the touch driving signal Active supplied to the third electrode 449.

When a variation in the potential of the third electrode 449 and a variation in the potential of the second electrode 435 are synchronized with each other in the touch detection period (Pt), as described above, a magnitude of the electric field generated between the third electrode 449 and the second electrode 435 is reduced. That is, the magnitude of the parasitic capacitance occurring between the third electrode 449 and the second electrode 435 is reduced. As a result, the detection sensitivity of the change in the capacitance of the third electrode 449 occurring by the object to be detected coming close to the third electrode 449 in the touch detection period (Pt) can be improved.

In the touch detection period (Pt), the cathode power supply potential PVSS supplied to the second electrode 435 varies in synchronization with the touch driving signal Active, as described above. Therefore, a potential difference between the anode power supply potential PVDD and the cathode power supply potential PVSS in the touch detection period (Pt) differs from a potential difference between the anode power supply potential PVDD and the cathode power supply potential PVSS in the light emission period (Pd) excluding the touch detection period (Pt). In other words, a magnitude of a current provided to the light emitting element D1 in the touch detection period (Pt) differs from a magnitude of a current provided to the light emitting element D1 in the light emission period (Pd) excluding the touch detection period (Pt). Thus, a luminance of the light emitting element D1 changes between the touch detection period (Pt) and the light emission period (Pd) excluding the touch detection period (Pt). As a result, a luminance of an image displayed on the display unit 101 may change in the touch detection period (Pt). Thus, an insertion time period and a number of times of insertion of the touch detection period (Pt) in one frame are respectively preferably a sufficient time period and number of times for an observer not to be able to visually recognize the change in the luminance of the image displayed on the display unit 101, although not particularly limited. As one example, a frame frequency of the image displayed on the display unit 101 in the display device 100 according to the present embodiment may be 120 Hz, and the number of times of insertion of the touch detection period (Pt) may be two times (240 Hz) in one frame. Alternatively, the frame frequency of the image displayed on the display unit 101 may be 60 Hz, and the number of times of insertion of the touch detection period (Pt) may be two times (120 Hz) in one frame.

The low-level potential of the pulse wave serving as the touch driving signal Active can be set to the same potential as the anode power supply potential PVDD, and the high-level potential thereof can be set to a potential higher than the low-level potential. In this case, in the touch detection period (Pt) in which the touch driving signal Active is supplied to the second electrode 435, all the sub-pixels 103 are a non-lighting state. That is, in the touch detection period (Pt), all the sub-pixels 103 are a so-called black display state. At this time, a pulse wave serving as the touch detection signal is preferably synchronized with the pulse wave serving as the touch driving signal Active at the same potential. Thus, a capacitance is inhibited from occurring between the second electrode 435 and the third electrode 449.

Figure 10:
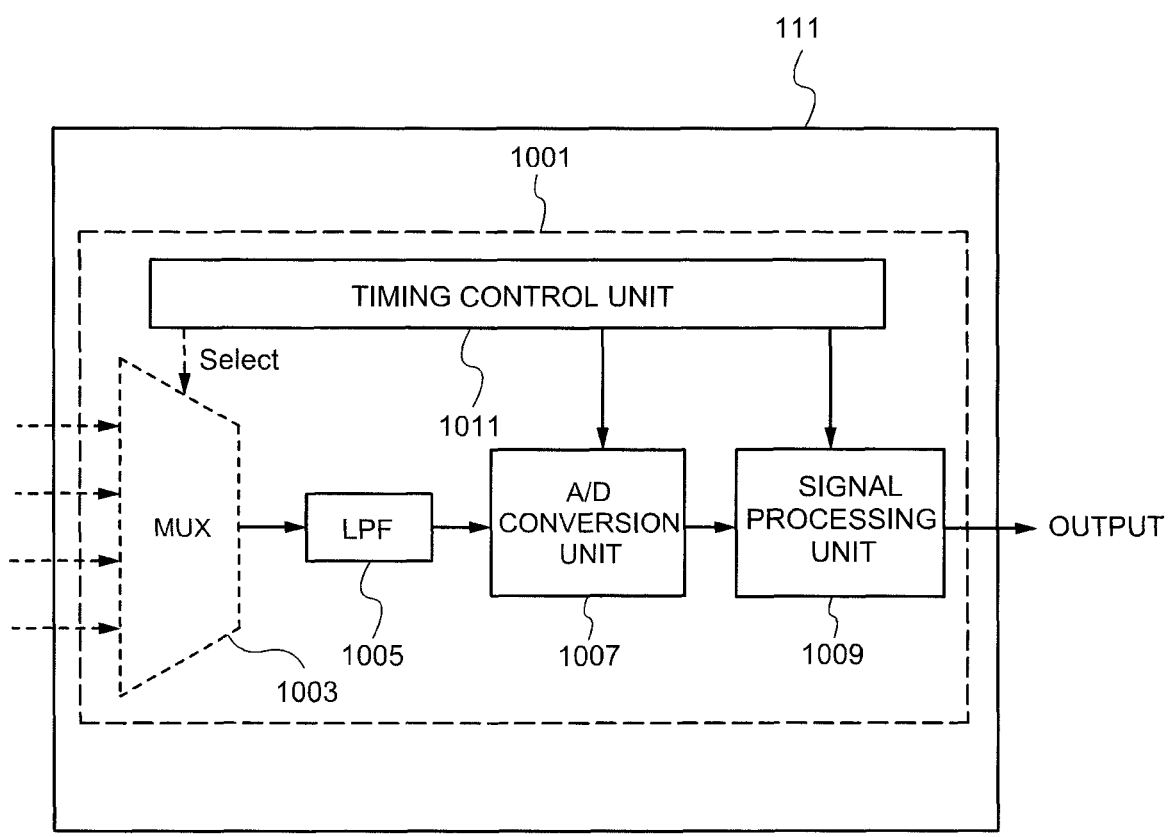
FIG. 10 is a functional block diagram illustrating a configuration of a touch detection circuit in the display device according to the first embodiment of the present invention.

FIG. 10 is a functional block diagram illustrating a configuration of the touch detection circuit 111 in the display device 100 according to the present embodiment. The touch detection circuit 111 includes at least one detection unit 1001. The detection unit 1001 includes an analog LPF unit 1005, an A/D conversion unit 1007, a signal processing unit 1009, and a timing control unit 1011. The detection unit 1001 may include a multiplexer (MUX) 1003. An example in which the touch detection circuit 111 includes one detection unit 1001 and the detection unit 1001 includes the MUX 1003 will be described below.

The third electrodes 449 (the touch detection electrodes) provided in the touch sensor unit 103 enter an active state upon being supplied with the touch driving signal Active in the touch detection period. When an object to be detected such as a finger comes close to the third electrode 449 in the active state, the capacitance of the third electrode 449 changes. The touch detection circuit 111 receives the touch detection signal corresponding to the capacitance of each of the third electrodes 449 in the touch detection period via the touch detection signal line 603.

The touch detection signal supplied via the touch detection signal line 603 is supplied to the MUX 1003 in the detection unit 1001. The MUX 1003 has a plurality of input terminals to which the touch detection signal is input and an output terminal which outputs the input touch detection signal in a time divisional manner. The MUX 1003 also has a control input terminal to which a selection signal Select is input.

The touch detection signal is supplied to the MUX 1003 from each of the plurality of third electrodes 449. The MUX 1003 selects the touch detection signal corresponding to the predetermined third electrode 449 from among the plurality of touch detection signals based on the selection signal Select, and sequentially outputs the selected touch detection signal. That is, the MUX 1003 outputs the plurality of touch detection signals respectively supplied from the plurality of third electrodes 449 in a time divisional manner based on the selection signal Select. The selection signal Select is generated in the timing control unit 1011, and is supplied to the MUX 1003.

The analog LPF unit 1005 is an analog low-pass filter which removes a high-frequency component (noise component) included in the touch detection signal received from the MUX 1003 and extracts and outputs a touch component based on touch detection. A resistive element is provided between an input terminal of the analog LPF unit 1005 and a ground (GND), although not illustrated. The touch detection signal from which noise has been removed is transmitted to the A/D conversion unit 1007.

The A/D conversion unit 1007 samples the touch detection signal received from the analog LPF unit 1005, and converts the sampled touch detection signal into a digital signal. The digital signal is transmitted to the signal processing unit 1009.

The signal processing unit 1009 includes a digital filter which removes noise from the digital signal transmitted from the A/D conversion unit 1007 and extracts a touch component. The signal processing unit 1009 is a logic circuit which determines the presence or absence of touch detection on the touch sensor unit 103 based on the digital signal transmitted from the A/D conversion unit 1007.

The timing control unit 1011 performs control so that the MUX 1003, the A/D conversion unit 1007, and the signal processing unit 1009 operate in synchronization based on the control signals supplied from the signal control circuit 105.

An example in which the touch detection circuit 111 includes the one detection unit 1001 and the detection unit 1001 includes the MUX 1003 has been described above. However, a configuration of the touch detection circuit 111 in the display device 100 according to the present embodiment is not limited to this. For example, the touch detection circuit 111 may include two or more detection units 111. The MUX 1003 in the touch detection circuit 111 may be omitted. When the MUX 1003 is omitted in the touch detection circuit 111, a number of detection units 1001 corresponding to the number of third electrodes 449 provided in the touch sensor unit 103 are required.

Second Embodiment

Figure 11:
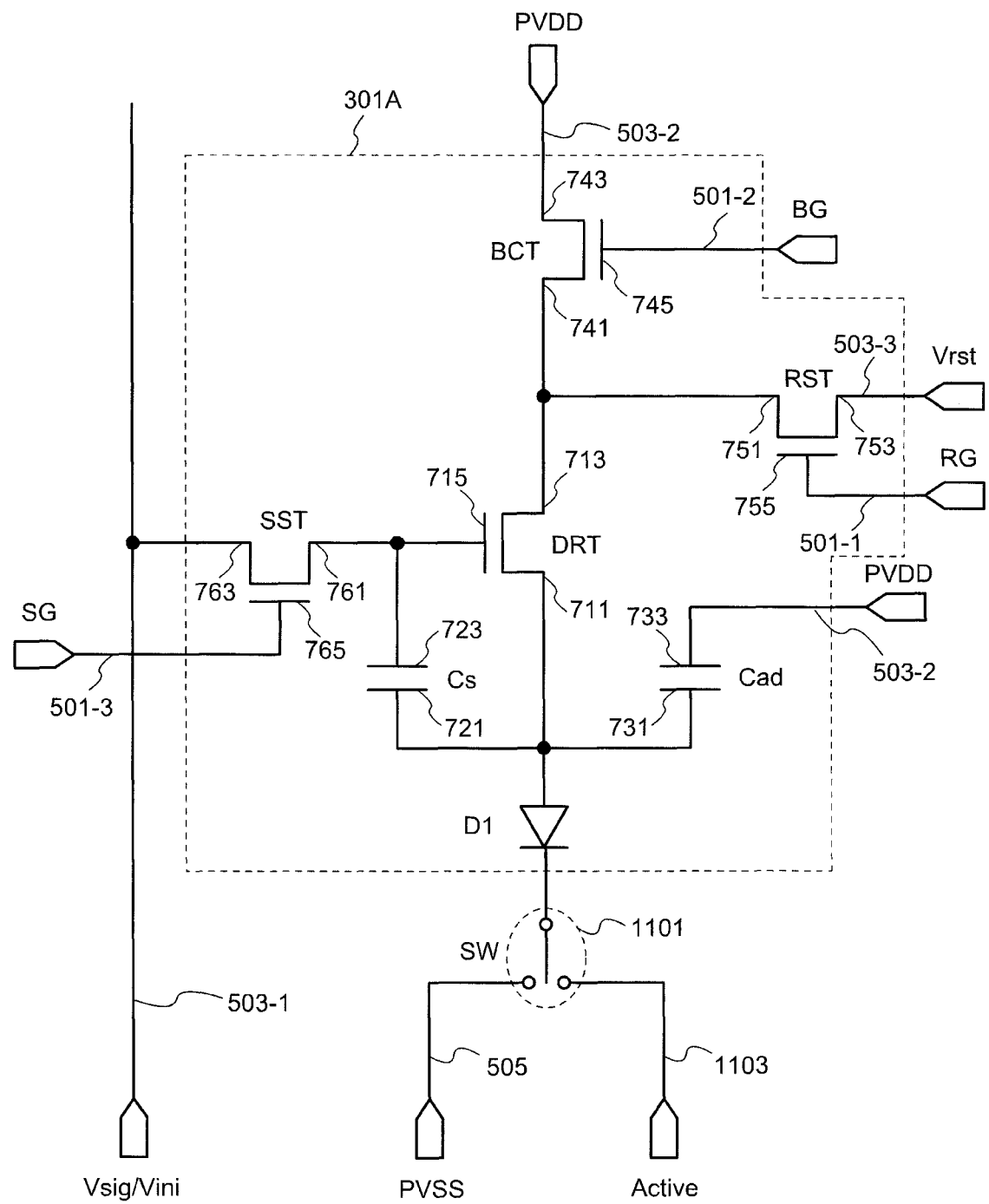
FIG. 11 is a circuit diagram illustrating an example of a circuit configuration of a pixel circuit according to a second embodiment of the present invention.

A display device according to another embodiment of the present invention will be described with reference to FIG. 11. In a second embodiment, a configuration of a pixel circuit different from that in the first embodiment will be described. FIG. 11 is a circuit diagram illustrating an example of a circuit configuration of the pixel circuit according to the second embodiment of the present invention. A sub-pixel 301A illustrated in FIG. 11 includes a light emitting element D1, a driving transistor DRT, an output transistor BCT, a reset transistor RST, a pixel selection transistor SST, a retentive capacitor Cs, and an auxiliary capacitor Cad. In the sub-pixel 301A illustrated in FIG. 11, identical or similar components to the components in the sub-pixel 301 according to the first embodiment described with reference to FIG. 7 are assigned the same reference numerals as the reference numerals illustrated in FIG. 7, and an overlapping description is omitted.

The display device 100A according to the present embodiment includes a switch 1101 which switches a signal line to be connected to a cathode terminal of the light emitting element D1. The sub-pixel 301A illustrated in FIG. 11 differs from the sub-pixel 301 in the display device 100 according to the first embodiment in that the cathode terminal of the light emitting element D1 is connected to a cathode power supply line 505 or a touch sensor driving signal line 1103 via the switch 1101. The switch 1101 connected to the cathode terminal of the light emitting element D1 has a contact connected to the cathode power supply line 505 and a contact connected to the touch sensor driving signal line 1103. In a light emission period excluding a touch detection period, the switch 1101 electrically connects the cathode terminal of the light emitting element D1 and the cathode power supply line 505. On the other hand, in the touch detection period, the switch 1101 electrically connects the cathode terminal of the light emitting element D1 and the touch sensor driving signal line 1103 to each other.

A selection control signal, which is synchronized with a touch driving control signal, is supplied from the signal control circuit 105 to the switch 1101, although not illustrated. The switch 1101 switches electrical connection between the cathode terminal of the light emitting element D1 and the cathode power supply line 505 and electrical connection between the cathode terminal and the touch sensor driving signal line 1103 based on the selection control signal. Using a method for driving the pixel circuit in the display device 100A according to the present embodiment, a touch driving signal Active is supplied to the cathode terminal of the light emitting element D1 when the light emitting element D1 and the touch sensor driving signal line 1103 are electrically connected to each other via the switch 1101 in the touch detection period. The method for driving the pixel circuit in the display device 100A according to the present embodiment is substantially the same as the method for driving the pixel circuit in the display device 100 according to the first embodiment described with reference to FIG. 8 except that the touch driving signal Active is supplied to the cathode terminal of the light emitting element D1 in the touch detection period.

In the sub-pixel 301A illustrated in FIG. 11, the touch driving signal Active is supplied to the cathode terminal of the light emitting element D1 via the touch sensor driving signal line 1103 in the touch detection period, as described above. That is, in the touch detection period, the touch driving signal Active is supplied to a second electrode 435 and a third electrode 449. Thus, in the touch detection period, there exists no potential difference between the second electrode 435 and the third electrode 449 so that there can be substantially no parasitic capacitance occurring between the third electrode 449 and the second electrode 435. Therefore, a detection sensitivity of a change in a capacitance of the third electrode 449 occurring by an object to be detected coming close to the third electrode 449 can be further improved.

The touch sensor driving signal line 1103 connected to the contact of the switch 1101 may be a touch sensor driving signal line 601 for supplying the touch driving signal Active to the third electrode 449. A touch sensor driving signal line for supplying the touch driving signal Active to the cathode terminal of the light emitting element D1 may be provided separately from the touch sensor driving signal line 601.

Third Embodiment

Figure 12:
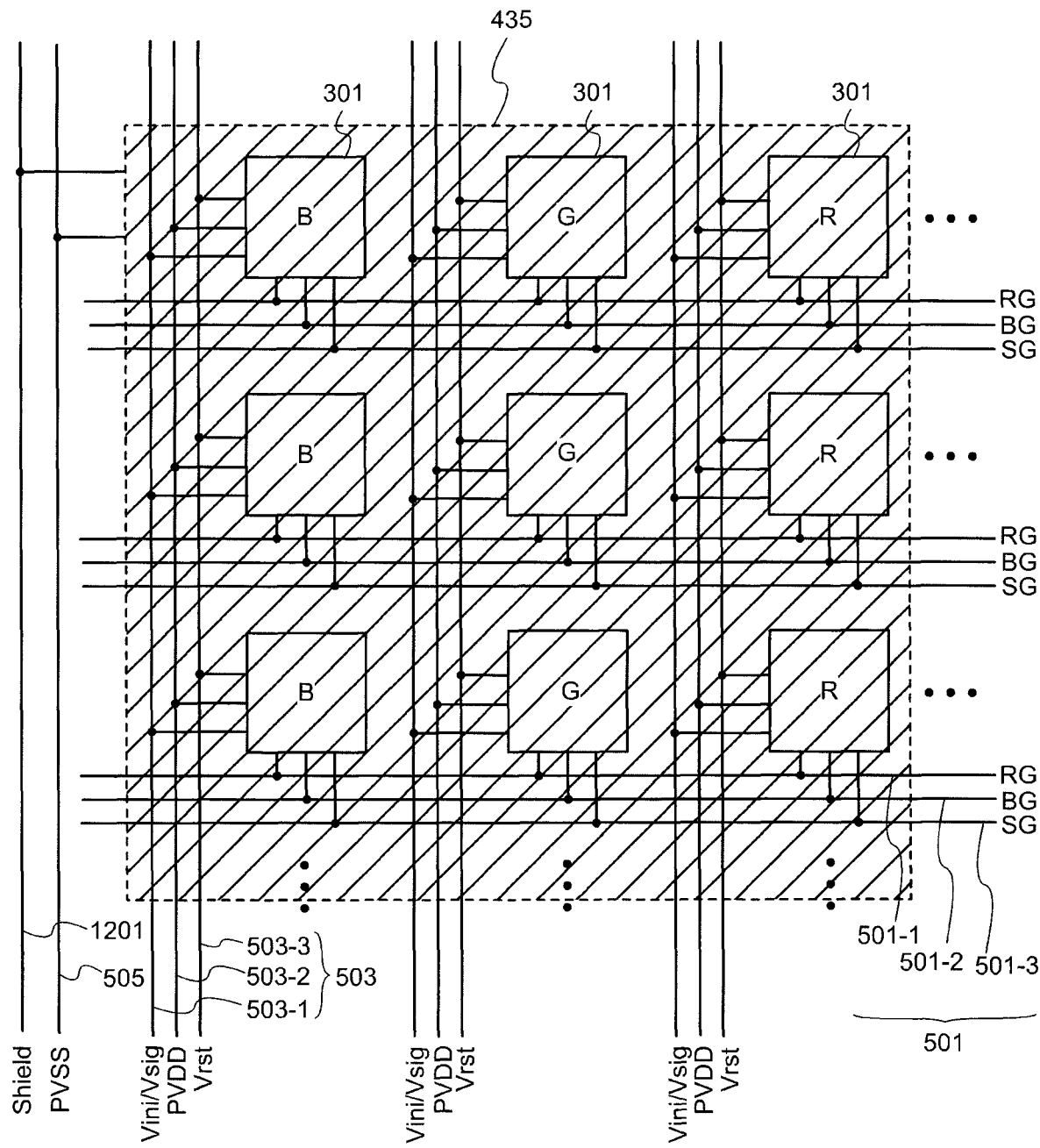
FIG. 12 is a schematic view illustrating an example of a circuit configuration of a display device according to a third embodiment of the present invention.
Figure 13:
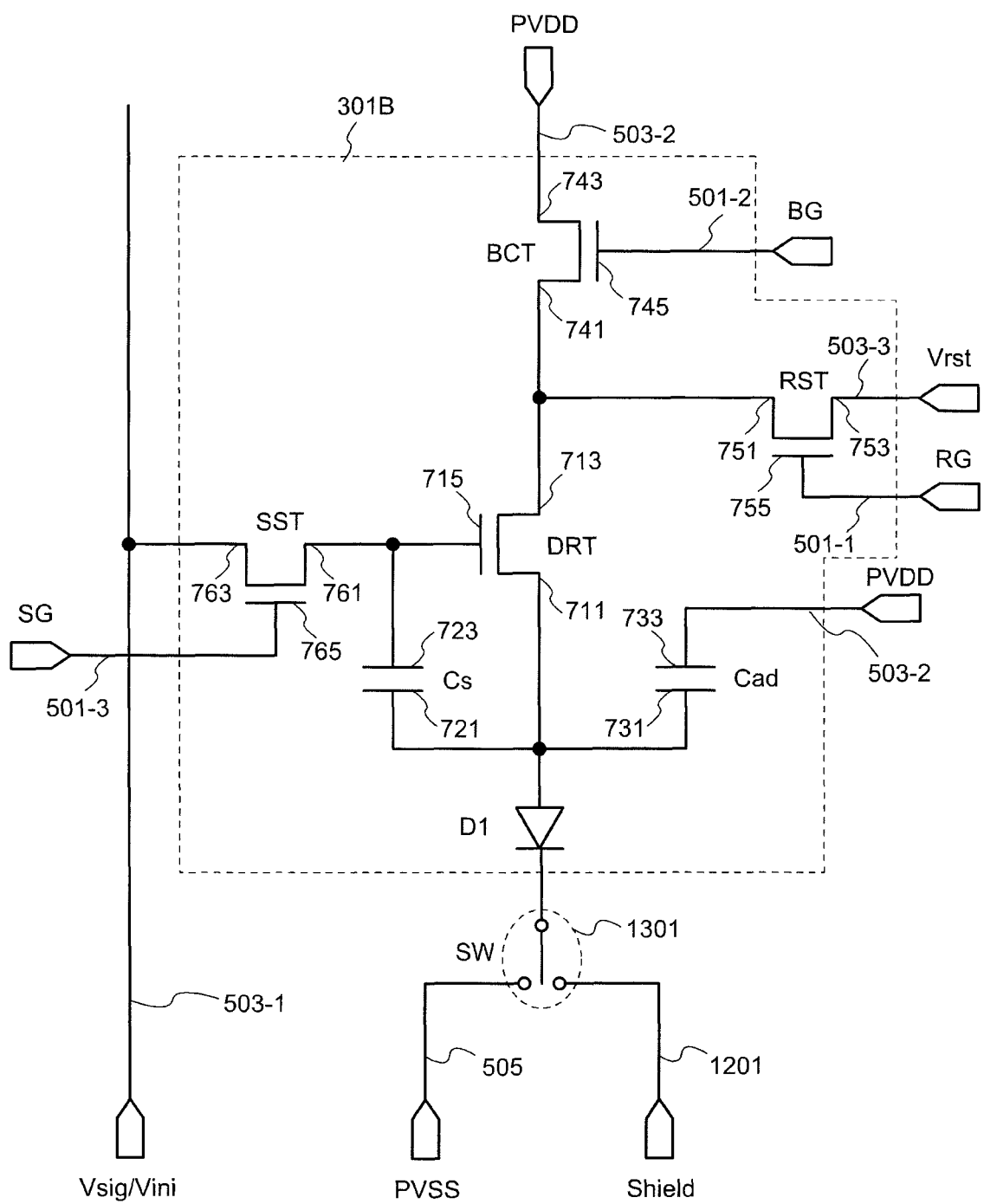
FIG. 13 is a circuit diagram illustrating an example of a circuit configuration of a pixel circuit according to the third embodiment of the present invention.

A display device according to still another embodiment of the present invention will be described with reference to FIGS. 12 and 13. In a third embodiment, a configuration of a pixel circuit different from those in the first and second embodiments will be described. FIG. 12 is a schematic view illustrating an example of a circuit configuration of the display device according to the third embodiment of the present invention. FIG. 13 is a circuit diagram illustrating an example of a circuit configuration of the pixel circuit according to the third embodiment of the present invention.

In the circuit configuration of the display device illustrated in FIG. 12, identical or similar components to the components in the circuit configuration according to the first embodiment described with reference to FIG. 5 are assigned the same reference numerals as the reference numerals illustrated in FIG. 5. In a sub-pixel 301B illustrated in FIG. 13, identical or similar components to the components in the sub-pixel 301 according to the first embodiment described with reference to FIG. 7 are assigned the same reference numerals as the reference numerals illustrated in FIG. 7, and an overlapping description is omitted.

A display device 100B according to the present embodiment includes a shield signal line (fourth power supply line) 1201 which supplies a shield signal Shield to a second electrode 435. The shield signal Shield is a signal which is synchronized with a touch driving signal Active in a touch detection period. The display device 100B according to the present embodiment includes a switch 1301 which switches a signal line to be connected to a cathode terminal of a light emitting element D1. Using a method for driving a pixel circuit in the display device 100B according to the present embodiment, when the light emitting element D1 and the shield signal line 1201 are electrically connected to each other via the switch 1301 in the touch detection period, the shield signal Shield, which is synchronized with the touch driving signal Active, is supplied to the cathode terminal of the light emitting element D1. The method for driving the pixel circuit in the display device 100B according to the present embodiment is substantially the same as the method for driving the pixel circuit in the display device 100 according to the first embodiment described with reference to FIG. 8 except that the shield signal Shield is supplied to the cathode terminal of the light emitting element D1 in the touch detection period.

The shield signal Shield is synchronized with the touch driving signal Active, as described above. A difference of a potential of the shield signal Shield from a potential of the touch driving signal Active supplied to a third electrode 449 is preferably small such that a detection sensitivity of a change in a capacitance of the third electrode 449 occurring by an object to be detected coming close to the third electrode 449 does not decrease. In the touch detection period, the potential of the shield signal Shield supplied to a second electrode 435 is more preferably substantially the same as the potential of the touch driving signal Active supplied to the third electrode 449. The shield signal Shield is generated in a power supply unit 113, and is supplied to the second electrode 435 via an IC chip 207, the shield signal line 1201, and the switch 1301.

The sub-pixel 301B illustrated in FIG. 13 differs from the sub-pixel 301 in the display device 100 according to the first embodiment and the sub-pixel 301A in the display device 100A according to the second embodiment in that the cathode terminal of the light emitting element D1 is electrically connected to a cathode power supply line 505 or the shield signal line 1201 via the switch 1301. The switch 1301 connected to the cathode terminal of the light emitting element D1 has a contact connected to the cathode power supply line 505 and a contact connected to the shield signal line 1201. In a light emission period excluding the touch detection period, the switch 1301 electrically connects the cathode terminal of the light emitting element D1 and the cathode power supply line 505 to each other. On the other hand, in the touch detection period, the switch 1301 electrically connects the cathode terminal of the light emitting element D1 and the shield signal line 1201 to each other.

A selection control signal, which is synchronized with a touch driving control signal, is supplied from the signal control circuit 105 to the switch 1301, although not illustrated. The switch 1301 switches electrical connection between the cathode terminal of the light emitting element D1 and the cathode power supply line 505 and electrical connection between the cathode terminal of the light emitting element D1 and the shield signal line 1201 based on the selection control signal.

In the sub-pixel 301B illustrated in FIG. 13, the shield signal Shield is supplied to the cathode terminal of the light emitting element D1 via the shield signal line 1201 in the touch detection period. The shield signal Shield is synchronized with the touch driving signal Active supplied to the third electrode 449. When a potential of the third electrode 449 and a potential of the second electrode 435 are synchronized with each other in the touch detection period, a potential difference between the second electrode 435 and the third electrode 449 is reduced. Thus, a magnitude of an electric field generated between the third electrode 449 and the second electrode 435 can be reduced. As a result, a parasitic capacitance occurring between the third electrode 449 and the second electrode 435 in the touch detection period can be reduced. Therefore, the detection sensitivity of the change in the capacitance of the third electrode 449 occurring by the object to be detected coming close to the third electrode 449 can be improved.

Fourth Embodiment

Figure 14:
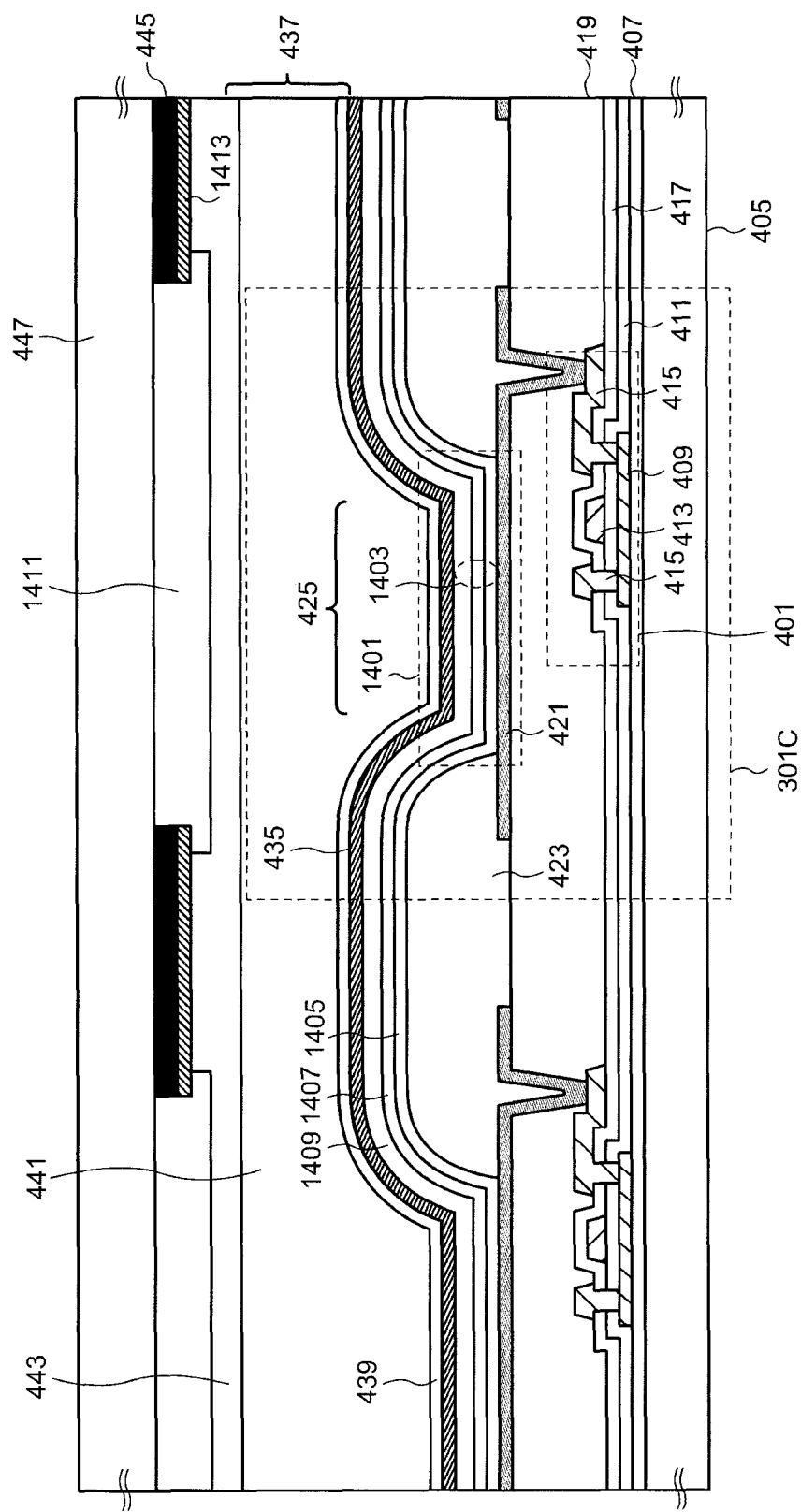
FIG. 14 is a cross-sectional view illustrating an outline of a display device according to a fourth embodiment of the present invention.

A display device according to still another embodiment of the present invention will be described with reference to FIGS. 14 and 16. In a fourth embodiment, a configuration of a display device different from that in the first embodiment will be described. FIG. 14 is a cross-sectional view illustrating an outline of a display device 100C according to the fourth embodiment of the present invention. In the display device 100C illustrated in FIG. 14, identical or similar components to the components in the display device 100 according to the first embodiment described with reference to FIG. 4 are assigned the same reference numerals as the reference numerals illustrated in FIG. 4, and an overlapping description is omitted.

As illustrated in FIG. 14, a transistor 401 and a light emitting element 1401 connected to the transistor 401 are provided in a sub-pixel 301C. The light emitting element 1401 includes an EL layer 1403. The EL layer 1403 comprises a hole transport layer 1405, a light emitting layer 1407, and an electron transport layer 1409. In the present embodiment, the EL layer 1403 including the hole transport layer 1405, the light emitting layer 1407, and the electron transport layer 1409 is continuous among sub-pixels 301C. In other words, the EL layer 1403 is common among the sub-pixels 301C. In the display device 100C, an insulating film 437, a color filter 1411, a third electrode 1413, a light shielding layer 445, and an opposite substrate 447 are provided on a second electrode 435. That is, in the display device 100C according to the present embodiment, the third electrode 1413 is provided on the light shielding layer 445 to overlap the light shielding layer 445, unlike in the display device 100 according to the first embodiment. The display device 100C is an EL display device which realizes desired color display by the light emitting element 1401 which emits light in white and the color filter 1411.

Figure 15:
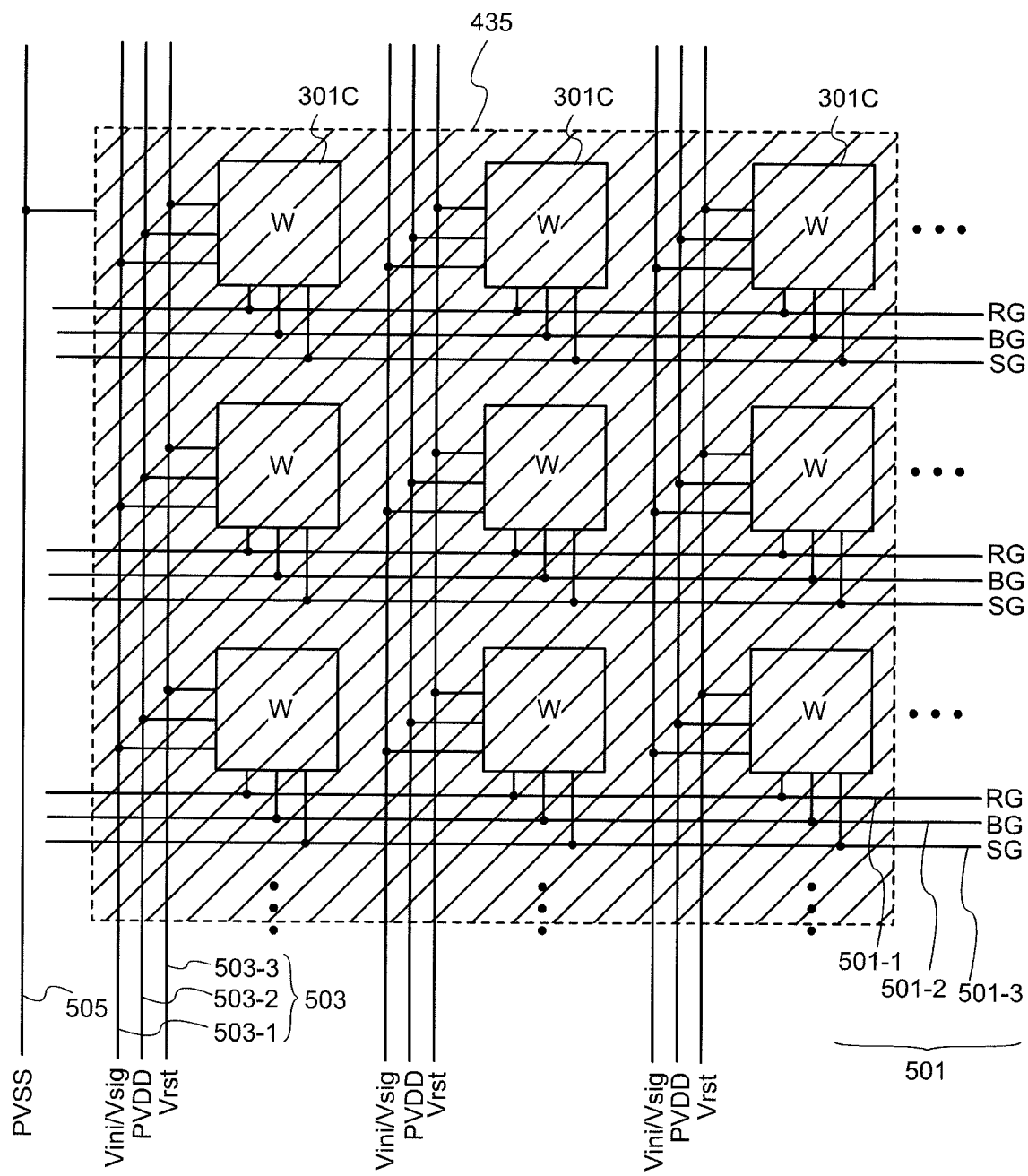
FIG. 15 is a schematic view illustrating an example of a circuit configuration of the display device according to the fourth embodiment of the present invention.

FIG. 15 is a schematic view illustrating an example of a circuit configuration of the display device 100C according to the present embodiment. As illustrated in FIG. 15, the sub-pixels 301C are arranged in a matrix manner of x rows and y columns in the display device 100C. In the display device 100C, the light emitting element 1401 in the sub-pixel 301C is a white light emitting element, as described above.

Figure 16:
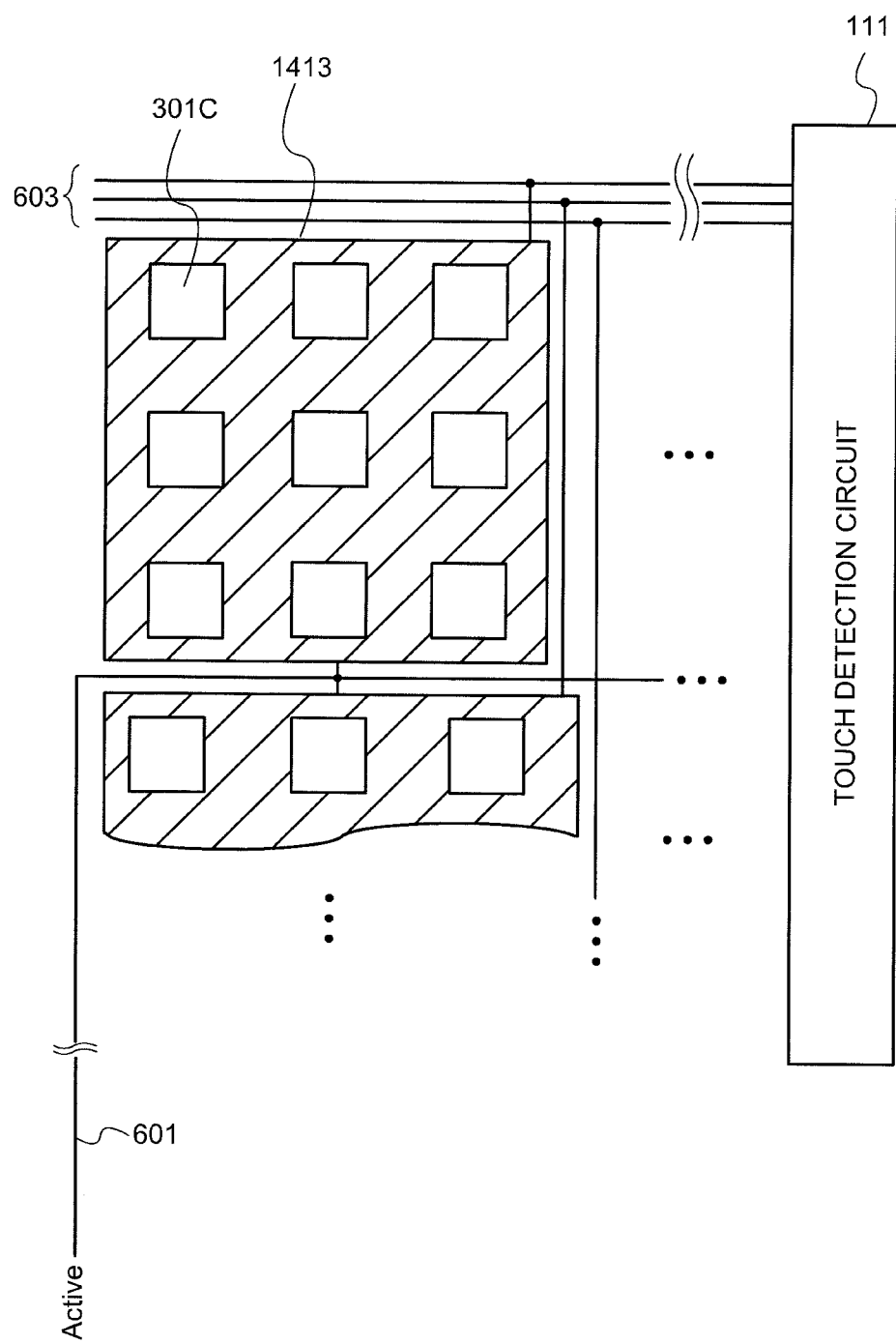
FIG. 16 is a schematic view illustrating an example of a configuration of the display device according to the fourth embodiment of the present invention.

FIG. 16 is a schematic view illustrating an example of a configuration of the display device 100C according to the present embodiment. As described with reference to FIG. 14, the third electrode 1413 is provided on the light shielding layer 445 provided around the sub-pixels 301C arranged in a matrix manner of x rows and y columns to overlap the light shielding layer 445. While the one third electrode 1413 is provided around the nine sub-pixels 301C in FIG. 16, an arrangement of the third electrode 1413 is not limited to this. A third electrode 1413 is provided around the sub-pixels in i row×j columns (both i and j are respectively any integers). A touch sensor driving signal line 601 is connected to the third electrode 1413. The touch sensor driving signal line 601 is connected to a power supply unit 113 provided in an IC chip 207. A touch driving signal Active is supplied to the touch sensor driving signal line 601 from the power supply unit 113 via the IC chip 207.

A method for driving a pixel circuit in the display device 100C according to the present embodiment is substantially the same as the method for driving the pixel circuit in the display device according to each of the above-described first to third embodiments. In a touch detection period, a signal, which is synchronized with the touch driving signal Active supplied to the third electrode 1413, is supplied to the second electrode 435. For example, a cathode power supply potential PVSS, which is synchronized with the touch driving signal Active, may be supplied to the second electrode 435 via a cathode power supply line 505 in the touch detection period, like in the method for driving the pixel circuit according to the first embodiment. The display device 100C may be provided with a switch for switching connection between the cathode power supply line 505 and the touch sensor driving signal line 601 and the second electrode 435, like in the method for driving the pixel circuit according to the second embodiment. Using the switch, the touch sensor driving signal line 601 and the second electrode 435 may be electrically connected to each other via the switch, to supply the touch driving signal Active to the second electrode 435 via the touch sensor driving signal line 601 in the touch detection period. The display device 100C may be provided with a shield signal line for transmitting a shield signal Shield which is synchronized with the touch driving signal Active and a switch for switching connection between the shield signal line and the cathode power supply line 505 and connection between the shield signal line and the second electrode 435, like in the driving method according to the third embodiment. In the touch detection period, the shield signal line and the second electrode 435 may be electrically connected to each other via the switch, to supply the shield signal Shield to the second electrode 435 via the shield signal line.

As described above, also in the sub-pixel 301C in the fourth embodiment, a signal, which is synchronized with the touch driving signal Active supplied to the third electrode 1413, is supplied to the second electrode 435 of the light emitting element 1401 in the touch detection period, like in the first embodiment to the third embodiment. When a potential of the third electrode 1413 and a potential of the second electrode 435 are synchronized with each other in the touch detection period, a potential difference between the second electrode 435 and the third electrode 1413 is reduced. Thus, a magnitude of an electric field generated between the third electrode 1413 and the second electrode 435 can be reduced. Therefore, a parasitic capacitance occurring between the third electrode 1413 and the second electrode 435 in the touch detection period can be reduced, and a detection sensitivity of a change in a capacitance of the third electrode 1413 occurring by an object to be detected coming close to the third electrode 1413 can be improved.

Fifth Embodiment

Figure 17:
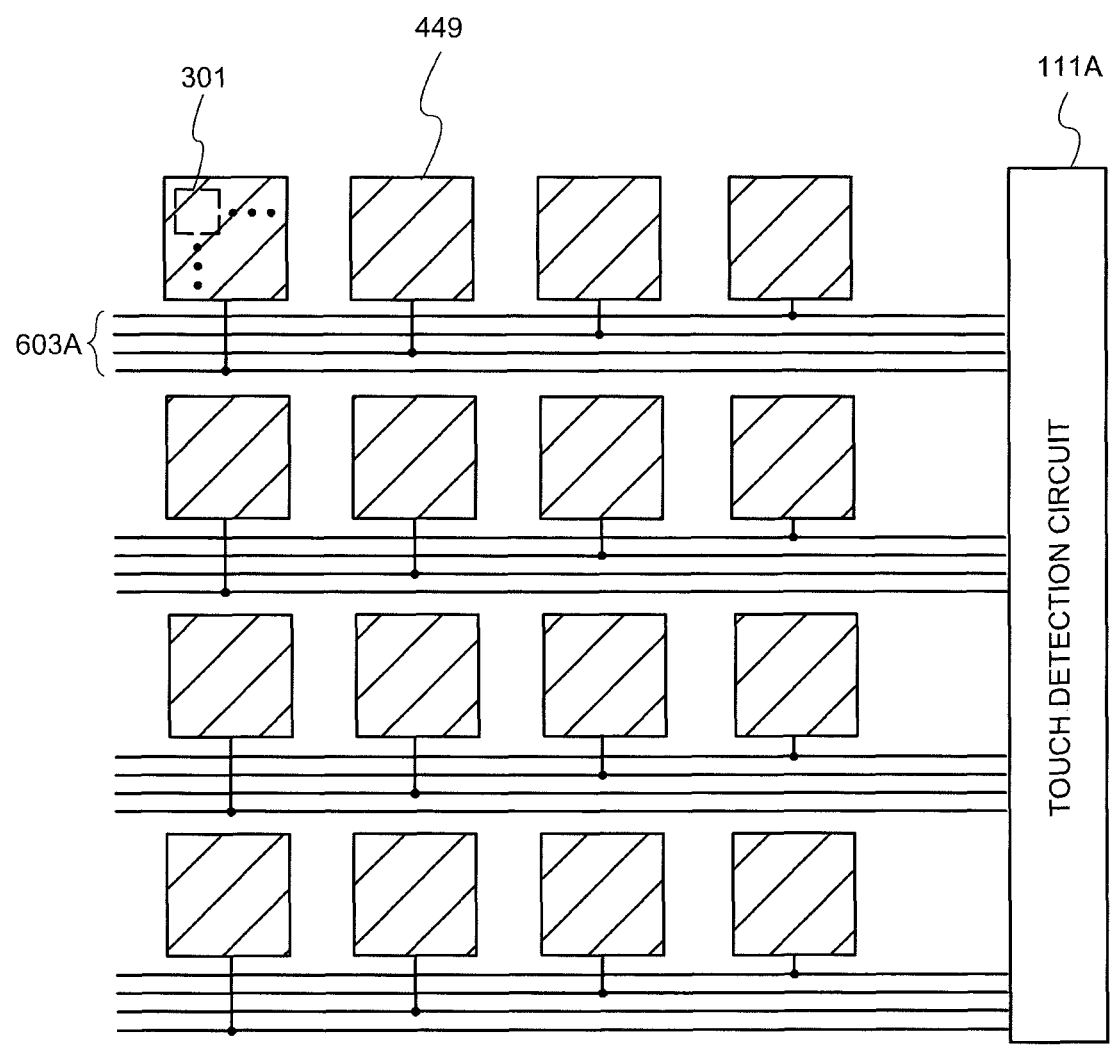
FIG. 17 is a schematic view illustrating an example of a configuration of a display device according to a fifth embodiment of the present invention.

A display device according to still another embodiment of the present invention will be described with reference to FIG. 17. In a fifth embodiment, a configuration of a display device different from that in the first embodiment will be described. FIG. 17 is a schematic view illustrating an example of a configuration of a display device 100D according to the fifth embodiment of the present invention. In the configuration of the display device 100D illustrated in FIG. 17, identical or similar components to the components in the display device 100 according to the first embodiment described with reference to FIG. 6 are assigned the same reference numerals as the reference numerals illustrated in FIG. 6, and an overlapping description is omitted.

As illustrated in FIG. 17, a plurality of third electrodes 449 are arranged in a matrix manner of i rows×j columns (both i and j are respectively any integers) in the display device 100D. Each of the third electrodes 449 is electrically connected to a touch detection circuit 111A via a touch detection signal line 603A. The third electrode 449 is electrically connected to the touch detection circuit 111A in a one-to-one relationship with the touch detection signal line 603A. In a touch detection period, the touch detection circuit 111A supplies a touch driving signal Active to each of the third electrodes 449 via the touch detection signal line 603A. The touch driving signal Active supplied from the touch detection circuit 111A is similar to the touch driving signal Active in the first embodiment described with reference to FIG. 8.

The touch detection circuit 111A includes at least one detection unit 1001, like the touch detection circuit 111 described with reference to FIG. 10. The touch detection circuit 111A includes a power supply unit (not illustrated) which supplies the touch driving signal Active and a switch (not illustrated). The switch switches electrical connection of the power supply unit and the detection unit 1001 with the third electrode 449 in the touch detection period.

When an object to be detected such as a finger comes close to the third electrode 449 in an active state, a capacitance of the third electrode 449 changes. The detection unit 1001 receives the touch detection signal corresponding to the capacitance of each of the third electrodes 449 in a period in which the detection unit 1001 and the third electrode 449 are electrically connected to each other via the switch. In the present embodiment, a variation in a potential of a signal supplied to a second electrode 435 and a variation in the touch driving signal Active are synchronized with each other in the touch detection period, like in the above-described embodiments.

Also in the present embodiment, when a potential of the third electrode 449 and a potential of the second electrode 435 are synchronized with each other in the touch detection period, a magnitude of an electric field generated between the third electrode 449 and the second electrode 435 is reduced. Therefore, a magnitude of a parasitic capacitance occurring between the third electrode 449 and the second electrode 435 can be reduced. As a result, a detection sensitivity of the change in the capacitance of the third electrode 449 occurring by the object to be detected coming close to the third electrode 449 can be improved. In the present embodiment, the touch driving signal Active is supplied to the third electrode 449 via the touch detection signal line 603A. Thus, a touch sensor driving signal line 601 illustrated in FIG. 6 can be omitted.

Figure 18:
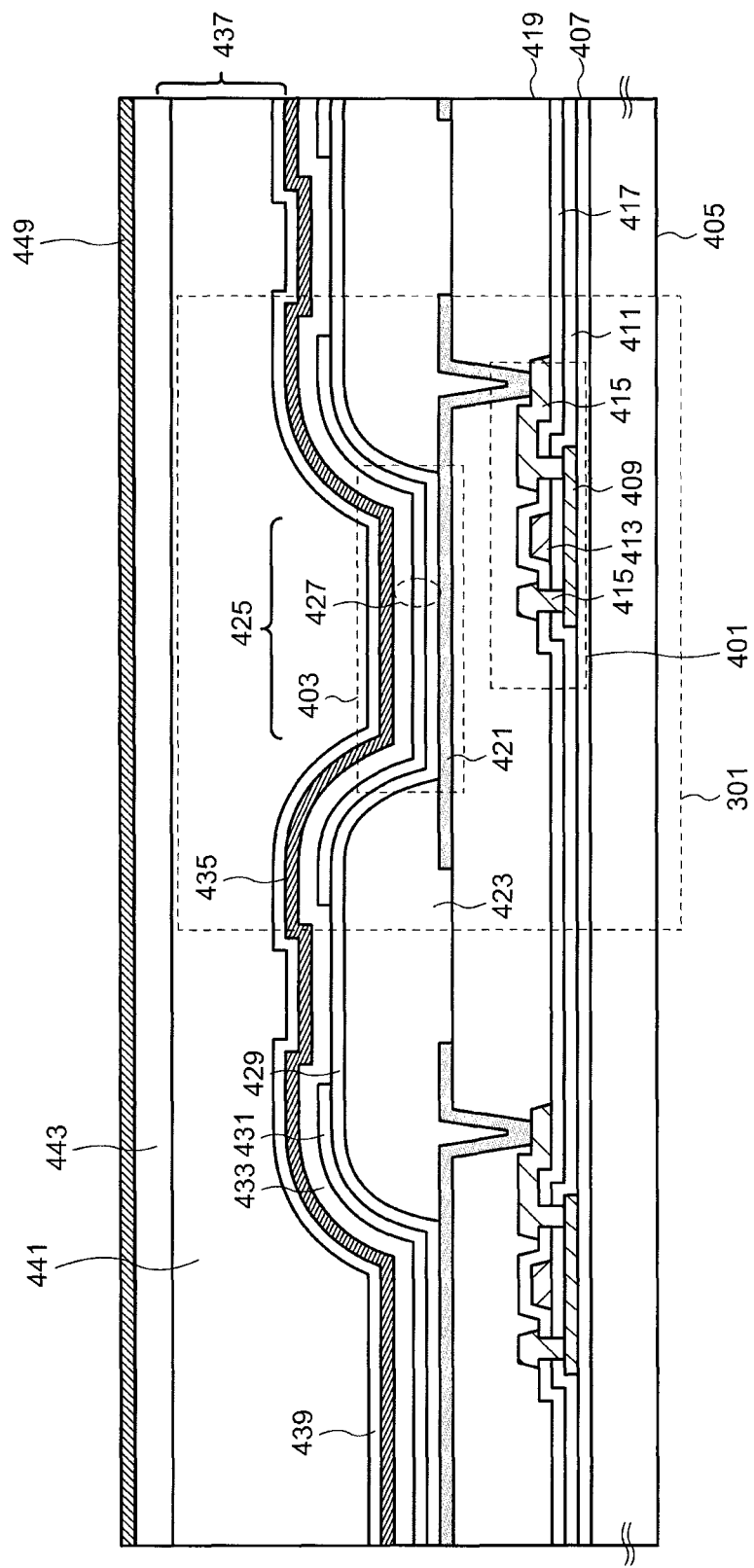
FIG. 18 is a cross-sectional view illustrating an outline of a display device according to a modification to the present invention.

The present invention is not limited to the above-described embodiments, and can be appropriately changed without departing from the spirit of the invention. For example, the display device according to the present invention may have a configuration as illustrated in FIG. 18. FIG. 18 is a cross-sectional view illustrating an outline of a display device according to a modification to the present invention. In FIG. 18, identical or similar components to the components in the display device 100 according to the first embodiment described with reference to FIG. 4 are assigned the same reference numerals as the reference numerals illustrated in FIG. 4, and an overlapping description is omitted.

As illustrated in FIG. 18, the display device has a substantially similar configuration to that of the display device 100 according to the first embodiment of the present invention illustrated in FIG. 6 except that an opposite substrate (the opposite substrate 447 illustrated in FIG. 6) and a light shielding layer (the light shielding layer 445 illustrated in FIG. 6) provided on the opposite substrate are omitted. If the opposite substrate is omitted, a third electrode 449 is provided on a third insulating layer 443. A configuration of the display device illustrated in FIG. 18 is applicable to the respective display devices according to the first to fifth embodiments, described above.

What is claimed is:

1. A display device comprising:
a gate line extending in a first direction, and the gate line supplying a control signal;
a first power supply line supplying a first potential;
a second power supply line supplying a second potential different from the first potential;
a third power supply line supplying a touch driving signal; and
a display unit including a plurality of sub-pixels; the display unit comprising:
a plurality of first electrodes respectively provided in the plurality of sub-pixels and electrically connected to the first power supply line;
a second electrode provided to be common among the plurality of sub-pixels and electrically connected to the second power supply line;
a light emitting layer provided between the first electrode in each of the plurality of sub-pixels and the second electrode;
an insulating layer provided on the second electrode;
a plurality of third electrodes provided on the insulating layer and electrically connected to the third power supply line;
a plurality of switching transistors respectively provided in the plurality of sub-pixels, the plurality of switching transistors respectively being electrically connected to the gate line, the plurality of switching transistors respectively being turned on or off based on the control signal, and each of the plurality of switching transistors controlling a voltage applied from the first power supply line to the corresponding first electrode; and
a signal control circuit supplying a signal synchronized with the touch driving signal to the second electrode in a touch detection period in which the touch driving signal is supplied to the plurality of third electrodes from the third power supply line,
wherein the control signal having a predetermined constant voltage is applied to the plurality of switching transistors via the gate line during the touch detection period, and
a first thickness of the insulating layer above the sub-pixel is greater than a second thickness of the insulating layer above an inter-sub-pixel area between the sub-pixels arranged next to each other.

2. The display device according to claim 1, wherein:
the inter-sub-pixel area is defined by edges of the first electrodes arranged next to each other.

3. The display device according to claim 2, wherein:
the insulating layer comprising a first insulating layer on the second electrode, a second insulating layer on the first insulating layer and a third insulating layer on the second insulating layer.

4. The display device according to claim 3, wherein:
the second insulating layer contains a filling material, a thickness of the second insulating layer is greater than a thickness of the first insulating layer and the third insulating layer.

5. The display device according to claim 4, wherein:
a first thickness of the second insulating layer above the sub-pixel is greater than a second thickness of the second insulating layer above the inter-sub-pixel area.

6. The display device according to claim 5, wherein:
the inter-sub-pixel area is defined by edges of the first electrodes arranged next to each other.

7. The display device according to claim 1, wherein:
a light shielding layer overlapping between the inter-sub-pixel area in plan view is disposed on the insulating layer.

8. The display device according to claim 7, wherein:
a substrate is interposed between the light shielding layer and the third electrode.

9. The display device according to claim 1, further comprising:
a fourth power supply line supplying a signal synchronized with the touch driving signal to the second electrode; and a switch switching a state where the second electrode is connected to the second power supply line and a state where the second electrode is connected to the fourth power supply line.

10. The display device according to claim 9, wherein the second electrode is connected to the fourth power supply line via the switch in the touch detection period.

11. The display device according to claim 1, further comprising:
a touch detection circuit electrically connected to each of the plurality of third electrodes, the touch detection circuit detecting a change in a capacitance of the third electrode,
wherein the touch detection circuit comprises a detection unit detecting the change in the capacitance of each of the third electrodes based on a signal corresponding to the capacitance of the third electrode.

12. The display device according to claim 11, wherein the touch detection circuit comprises a plurality of detection units.

13. The display device according to claim 11, wherein the detection unit further comprises a multiplexer having two or more input terminals electrically connected to two or more of the plurality of third electrodes and an output terminal outputting signals respectively corresponding to capacitances of the two or more third electrodes connected to the two or more input terminals in a time divisional manner.

14. The display device according to claim 1, wherein:
the insulating layer comprising a first insulating layer on the second electrode, a second insulating layer on the first insulating layer and a third insulating layer on the second insulating layer.

15. The display device according to claim 1, wherein:
a substrate is interposed between the insulating layer and the third electrode.

16. The display device according to claim 1, further comprising:
a video signal line extending in a second direction intersecting the first direction and the video signal line supplying a video signal,
wherein the gate line and video signal line are connected to one of the sub-pixels.

* * * * *